United States Patent [19]
Ooi et al.

[11] Patent Number: 5,798,805
[45] Date of Patent: Aug. 25, 1998

[54] PROJECTION TYPE DISPLAY APPARATUS

[75] Inventors: Yoshiharu Ooi; Tsuneo Wakabayashi, both of Yokohama, Japan

[73] Assignee: AG Technology Co., Ltd., Yokohama, Japan

[21] Appl. No.: 580,087

[22] Filed: Dec. 20, 1995

[30] Foreign Application Priority Data

Jan. 30, 1995 [JP] Japan .................. 7-013085

[51] Int. Cl.$^6$ .................. G02F 1/1335; G02F 1/137
[52] U.S. Cl. .................. 349/10; 349/95; 349/114; 349/67; 353/31
[58] Field of Search .................. 349/5, 8, 10, 95, 349/67, 62, 104, 114, 105, 106, 57; 353/31, 33, 34, 37, 97, 98, 99, 122, 84; 348/761, 766

[56] References Cited

U.S. PATENT DOCUMENTS

| | | |
|---|---|---|
| 4,834,509 | 5/1989 | Gunjima et al. . |
| 4,864,390 | 9/1989 | McKechnie et al. .......... 353/34 |
| 5,150,232 | 9/1992 | Gunkima et al. . |
| 5,216,531 | 6/1993 | Hirai et al. . |
| 5,245,449 | 9/1993 | Ooi et al. . |
| 5,274,480 | 12/1993 | Hirai et al. . |
| 5,283,675 | 2/1994 | Ooi et al. . |
| 5,386,306 | 1/1995 | Gunjima et al. . |
| 5,398,081 | 3/1995 | Jones .......... 349/5 |
| 5,467,206 | 11/1995 | Loiseaux et al. .......... 349/5 |
| 5,621,486 | 4/1997 | Doany et al. .......... 349/62 |
| 5,631,750 | 5/1997 | Minoura et al. .......... 349/5 |
| 5,633,737 | 5/1997 | Tanaka et al. .......... 349/5 |
| 5,648,860 | 7/1997 | Ooi et al. .......... 349/10 |
| 5,659,409 | 8/1997 | Ooi et al. .......... 349/10 |

FOREIGN PATENT DOCUMENTS

WO 96/02113  1/1996  WIPO .

*Primary Examiner*—William L. Sikes
*Assistant Examiner*—Tai V. Duong
*Attorney, Agent, or Firm*—Oblon, Spivak, McClelland, Maier & Neustadt, P.C.

[57] ABSTRACT

A projection type display apparatus has a light source optical system, a first filter (1), a first aperture (17), a condenser lens (13), a liquid crystal element (15) having a color filter for each pixel, a second aperture (18), a second filter (2), a projection optical system which form a schlieren optical system wherein first and second filters each composed of a spectral element for controlling each color of R, G and B are provided.

21 Claims, 27 Drawing Sheets

PROJECTION TYPE DISPLAY APPARATUS

BACKGROUND OF THE INVENTION

1. Field of the Invention

The present invention relates to a display element as a non-luminous type light valve. In particular, it relates to a projection type display apparatus using a transparent-scattering type liquid crystal display element and an illumination apparatus using the same.

2. Discussion of Background

Display elements can be generally classified in terms of optical function into a light absorbing type element and a light scattering type element. The former is exemplified as a TN type liquid crystal display element (TN-LCD) using polarization plates. As an example of the later, there have been known a dynamic scattering type liquid crystal display element (DS-LCD) and a display element wherein a fine dipole capable of responding to an electromagnetic field is interposed between electrodes.

In the light scattering type display element, a display is obtainable by using scattering and non-scattering (transmitting) of light in a functioning layer by which light is modulated. As a new light scattering type liquid crystal display element, there has been proposed a liquid crystal display element using a liquid crystal solidified matrix composite (hereinbelow, referred to as LCSM) which has various characteristics.

For instance, U.S. Pat. No. 4,834,509 describes to form LCSM-LCD by a photopolymerization induced phase separating method in which a photo-settable vinyl type compound is used. Further, U.S. Pat. No. 5,150,232 describes that a projection type liquid crystal display device is constructed in the combination of LCSM-LCD and TFT. Further, U.S. Pat. No. 5,245,449 describes a projection type liquid crystal display device having a preferred optical arrangement in a three-color (R, G and B)-separating and synthesizing system.

Further, U.S. Pat. No. 5,103,327, U.S. Pat. No. 5,206,746, U.S. Pat. No. 5,216,531, U.S. Pat. No. 5,196,952, U.S. Pat. No. 5,235,445, U.S. Pat. No. 5,274,480 and U.S. Pat. No. 5,283,675 describe preferred constructions of LCSM or LC/PC, the entire construction of the systems, compositions, optical arrangements and so on in order to obtain projection type display apparatuses of high performance.

In particular, U.S. Ser. No. 08/133222 which is pending as a U.S. application and U.S. Ser.No. 6896/198275 which is a CIP application of the pending application describe optical systems containing a light source and a projection optical system in projection type display apparatuses.

Generally, an optical system using a single display element is advantageous in reducing the size and manufacturing cost in comparison with an optical system using three display elements since the optical system is simplified. However, the former is inferior to the optical system using three display elements from the viewpoint of the brightness of a projected image and the color gamut or impurity.

Since a color filter which has been conventionally used is prepared by mixing a coloring matter in a resinous material, it is insufficient in a wavelength separation performance, and accordingly, when a white light source such as a halogen lamp, a metal halide lamp, a xenon lamp or the like which show high color rendering properties was used, deterioration of color gamut was remarkable.

FIG. 16 shows the emission spectrum of a typical metal halide lamp used as the projection light source for a projection type liquid crystal display device, and FIG. 17 shows the spectral transmittance of a pigment dispersing type RGB color filter. Accordingly, when the metal halide lamp is used as the projection light source and a panel in which a pigment dispersing type RGB color filter is formed for each pixel is used as a single liquid crystal display element, the chromaticity coordinate for a projected color image is limited to a narrow range as indicated by a dotted line in FIG. 8.

Generally, a schlieren optical system is used as a basic optical system for a projection type display apparatus in which a transparent-scattering type display element is used. Such optical system is, for instance, described in "Proceedings of S.I.D. vol. 18/2, 1977 p. 135–146 (A. G. Dewey)".

The scattering power of LCSM-LCD having a transparent-scattering type operation mode depends on wavelength, and the scattering power is higher as the wavelength is shorter. Further, the transmittance in a transparent state is low as the wavelength is short although it depends on a combination of a solidified material and liquid crystal.

FIG. 23 shows an example of the spectral transmittance of such LCSM-LCD in a scattering state ($T_{OFF}$), a transparent state ($T_{ON}$) and an intermediate state ($T_M$). The spectral characteristics were obtained by measuring under a condition that the dispersing angle of incident light to LCSM-LCD and the collection angle of a part of emission light which passes through LCSM-LCD and is projected onto a screen through a projection lens, are each 7°.

FIG. 24 shows the wavelength dependence characteristics of the contrast ratio as the ratio of transmittance in a transparent state and a scattering state (It is related to the ratio of brightness and darkness on a projected picture surface). The characteristics were obtained by measuring under the same condition as that of FIG. 23. The contrast ratio is reduced as the wavelength is increased.

Accordingly, when LCSM-LCD is used for the projection type display apparatus, light of shorter wavelength is insufficient and light of longer wavelength is excessive in an image of modulated light. Therefore, the projected image has a low color temperature in comparison with the color of light source. In particular, since the scattering power of light of longer wavelength is low in a range from a dark level to an intermediate level in picture display, the amount of projection light is too much, whereby the color tone of the projected white image indicates a brown color, which deteriorates the quality of the image.

There are known conventional techniques as described below, in order to improve such problems. The conventional techniques concern a liquid crystal display element which is provided with a light modulation functioning layer which is substantially the same as LCSM.

First, the invention disclosed in WO93/23787 is explained. In this invention, a dichroic coloring matter which absorbs a red color light is mixed with liquid crystal to obtain a liquid crystal display element wherein there is substantially no absorption of red color in a transparent state during the application of a voltage while red color is absorbed in a scattering state without applying the voltage whereby the transmittance is reduced and the wavelength dependence of the contrast ratio is decreased. In this invention, the dichroic color matter for a red color is necessary.

When a light reflecting layer is provided at a side surface of such light scattering type display element to obtain a display element of reflecting type, incident light reciprocates in the scattering liquid crystal layer. Accordingly, display element of reflection type can remarkably improve the scattering power in comparison with a display element of transmissive type when the same driving voltage is used.

Further, in a TN type liquid crystal display element (TN-LCD) of an active matrix driving transmissive type in which a polarization plate is used, there is an attempt to collect incident light to the opening portion of each pixel by forming a microlens array at the light incident side of the substrate of the liquid crystal display element, to thereby improve the transmittance of the panel, whereby the brightness of a projected image by the projection type liquid crystal display device is improved.

Further, Japanese Unexamined Patent Publication No. 249458/1993 which concerns an invention of LCSM-LCD of a reflecting type, describes an example in which a multi-layered mirror of dielectric substance is used as a reflecting layer. It further describes such a construction that a microlens array is arranged on a light transparent substrate at the light incident side to thereby collect incident light to a pixel electrode portion. FIG. 35 shows the structure in cross-section. The display element comprises an anti-reflection film 143, a microlens array 107, a transparent bonding layer 108, a front electrode substrate 141, an LCSM layer 144, a transparent electrode 142, a reflecting film 147, a back electrode 146 and a back electrode substrate 145. The conventional display element had a problem as follows. When the dispersing angle of incident light which is incident at an incident angle $\gamma$ is small and the incident light has parallel light beams, a light collecting function as shown in FIG. 35 can be obtained. However, when the thickness $d_y$ of the light incident side light transmitting substrate is sufficiently larger than a pitch $a_y$ of pixel or a dispersing angle of the parallel light is large, light collected to the reflecting pixel electrode by the microlens 107 and reflected from the reflecting pixel electrode can not be collected by an adjacent microlens. In this case, a sufficient brightness can not be obtained.

Further, U.S. Pat. No. 5,161,042 describes use of a TN type liquid crystal display element (TN-LCD) of transparent type in which a microlens array is provided so as to correspond to a three color light source of RGB and pixels of RGB. In this invention, although a single monochrome liquid crystal display element having no color filter is used, a projection type color liquid crystal display apparatus of high light utilization efficiency and wide color gamut can be obtained.

Further, an example using a phase volume grating as a thin film element for producing a three color light source of RGB is described in "Proceeding of ASIA DISPLAY 95, p. 87–89: B. A. Loiseaux, et. al." An example of using a holographic optical element instead of the three color light source of RGB and the microlens array to realize color separation of RGB and the function of collecting light to pixels, is described in "Proceeding of ASIA DISPLAY 95, p. 727–729: N. Ichikawa".

SUMMARY OF THE INVENTION

It is an object of the present invention to provide a projected image of wide color gamut and high contrast ratio while controlling the reduction of brightness in a projection type display apparatus using a single transparent-scattering type display element having a color filter for each pixel in which an auxiliary optical means is provided with a simple structural arrangement.

It is an object of the present invention to reduce the wavelength dependence of the contrast ratio of a projected image and to reduce a change of color balance in a half tone in a projection type display apparatus using a transparent-scattering type display element having the scattering power which varies depending on wavelengths in which an auxiliary optical means is provided with a simple structural arrangement.

Further, it is an object of the present invention to obtain a projected image of bright and high contrast ratio in a projection type display apparatus using a transparent-scattering type display element in which the display element is a single reflecting type display element provided with a light converging means in correspondence to a pixel electrode, wherein the display element does not include any coloring element and has a simple structure.

There is provided a projection type display apparatus comprising a light source, a display element and a projection means, characterized in that an image forming element is disposed in a light path at the light incident side of the display element and/or a light path at the light emission side of the display element; a first filter having a spectroscopic function is disposed in the light path at the light incident side of the display element; a second filter having a spectroscopic function is disposed in the light path at the light emission side of the display element; and the first and second filters are arranged in a conjugated positional relation with respect to the image forming element disposed in a light path between the first and second filters. The invention is referred to as the first invention.

The relation of conjugated image between A and B as defined in the above-mentioned invention means that an image A formed by an image forming element coincides with B, i.e. the shape of A is the same or similar to the shape of B.

Further, the positional relation of conjugated image between the first and second filter means that the spatial position (the shape) of color lights (transmitting wavelength bands) determined by the spectroscopic function of the filters is the same or similar.

The light source and the first filter are included as structural elements in a light source optical system, and the second filter and a projection lens are included as structural elements in a projection optical system. A lens is generally used as the image forming element, which is a structural element in the light source optical system or the projection optical system and which is disposed in the light path between the first and second filters.

There is provided a projection type display apparatus according to the first invention, which further comprises an ellipsoidal mirror, wherein the light source is located in the vicinity of the first focal point of the ellipsoidal mirror and the first filter is located in the vicinity of the second focal point of the ellipsoidal mirror; a plurality of regions $S_x$ (X=1–n, n≧2) are formed in the light passing plane of the first filter so that at least one of the regions allows only light having a specified wavelength range to pass through; the image forming element is a condenser lens by which diffusion light which has passed through the first filter is converged to the display element, and a conjugated image of the first filter is formed at or around the position of the pupil of the projection means; a plurality of regions $S_y$ (Y=1–n, n≧2) are formed in the light passing plane of the second filter so that at least one of the regions allows only light having a specified wavelength range which has passed through the display element, to pass through. The invention is referred to as the second invention.

There is provided a projection type display apparatus according to the first invention or the second invention.

wherein each of the first and second filters is provided with regions for regulating the wavelength range of three transmitting lights: red (R), green (G) and blue (B). The invention is referred to as the third invention.

There is provided a projection type display apparatus according to any one of the first through third inventions, wherein the display element has color filters of R, G and B for each pixel so that electric signals for picture image which correspond to the respective colors are applied to each pixel. This invention is referred to as the fourth invention. There is provided a projection type display apparatus according to any one of the first through fourth inventions, wherein the display element is transparent-scattering type liquid crystal display element, and the light source, the display element and the projection means are so arranged to form a schlieren optical system. This invention is referred to as the fifth invention.

There is provided a projection type display apparatus according to any one of the first through fifth inventions, wherein an auxiliary optical means is combined with the light source so that light fluxes having a dispersing angle of 10° or less with respect to the light of a specified wavelength which is regulated by the first filter, is irradiated to the display element.This invention is referred to as the sixth invention.

As a concrete example of the auxiliary optical means, there are an aperture stop and a cone-like material as described in the above-mentioned U.S. application in examination. For instance, there is a light transmitting cone-like prism which includes a convex cone-like prism having an apex angle $\alpha_1$ of cone-like surface of 90°–175° or a concave cone-like prism having an apex angle $\beta_1$ of 185°–270°. Or, there is a light reflecting cone-like reflector which includes a convex cone-like reflector having an apex angle of $\alpha_2$ of cone-like surface of 150°–177° or a concave cone-like reflector having an apex angle $\beta_2$ of 183°–210°.

There is provided a projection type display apparatus according to any one of the first through sixth inventions, wherein the display element is a transparent-scattering type liquid crystal display element comprising substrates with electrodes and a liquid crystal/resin composite layer including a nematic liquid crystal phase of positive dielectric anisotropy and a resin phase, which is interposed between the substrates. The invention is referred to as the seventh invention.

There is provided a projection type display apparatus according to any one of the first through seventh inventions, wherein the display element is a transparent-scattering type liquid crystal display element, and the surface area of the opening of the first filter region which passes a wavelength range of light providing a low scattering power is smaller than the surface area of the opening of the first filter region which passes a wavelength range of light providing a high scattering power. The invention is referred to as the eighth invention.

There is provided a projection type display apparatus according to any one of the first through eighth inventions, wherein the light passing plane of each of the first and second filters is provided with a region $S_A$ which passes a wavelength range A having the central wavelength $\lambda_A$, and a region $S_B$ which passes a wavelength range B having the central wavelength $\lambda_B$, and a relation of $0.8 \leq (K_A/K_B)^{0.5} \times (\lambda_A/\lambda_B) \leq 1.2$ is satisfied where $K_A$ or $K_B$ represents a surface area occupied by the regions $S_A$ or $S_B$ in the light passing plane. The invention is referred to as the ninth invention.

There is provided a projection type display apparatus according to any one of the first through ninth inventions, wherein the display element is a reflection type display element having a reflecting layer by which incident light is regularly reflected and emitted light is projected. The invention is referred to as the tenth invention.

There is provided a projection type display apparatus according to any one of the first through tenth inventions, wherein the reflecting layer is made of a dielectric multi-layered material. The invention is referred to as the eleventh invention.

There is provided a projection type display apparatus which comprises a light source; an image forming element; a reflection type display element comprising a light incident side transparent substrate, a light reflecting substrate having a reflecting layer, an electro-optical function layer interposed between the substrates, a pixel electrode, a first light converging means disposed at a position without contact to the electro-optical function layer of the light incident side transparent substrate so as to face the pixel electrode, and a second light converging means disposed between the electro-optical function layer and either one of the light incident side transparent substrate and the light reflecting substrate; a projection means; an image forming element disposed in a light path at the light incident side of the display element and/or a light path at the light emission side of the display element; a first filter having a spectroscopic function disposed in the light path at the light incident side of the display element; a second filter having a spectroscopic function disposed in the light path at the light emission side of the display element, wherein the first and second filters are arranged in a conjugated positional relation with respect to the image forming element disposed in a light path between the first and second filters. The invention is referred to as the twelfth invention.

There is provided a projection type display apparatus according to the twelfth invention, wherein the focal distance $F_1$ of the first light converging means is substantially equal to the focal distance $F_2$ of the second light converging means, and the distance t between the principal points of the first and second light converging means is substantially equal to the focal distance $F_1$ or the focal distance $F_2$. The invention is referred to as the thirteenth invention.

There is provided a projection type display apparatus according to any one of the twelfth or the thirteenth invention, wherein the first and second light converging means respectively have a lenticular structure comprising a plurality of cylindrical optical converging elements; the light source and the display element are so arranged that an optical axis AX of incident light to the display element and an optical axis BX of emission light reflected at a reflecting layer of the display element cooperatively form an angle of $2\gamma=2°-40°$ where a Y axis represents the azimuth of the parallel arrangement of the lenticular structure without having a light converging function and an X axis represents an orthogonal axis to the azimuth of the parallel arrangement of the lenticular structure having a light converging function; and the first and second light converging means are so arranged that a plane defined by the optical axis AX and the optical axis BX is in parallel to the Y axis. The invention is referred to as the fourteenth invention.

There is provided a projection type display apparatus according to any one of the twelfth through fourteenth inventions, wherein the first light converging means and/or the second light converging means is a microlens array. The invention is referred to as the fifteenth invention. There is provided a projection type display apparatus according to any one of the twelfth through fifteenth inventions, which further comprises an ellipsoidal mirror, wherein the light source is located in the vicinity of the first focal point of the ellipsoidal mirror and the first filter is located in the vicinity of the second focal point of the ellipsoidal mirror; a plurality of regions $S_x$ (X=1–n, n≧2) are formed in the light passing plane of the first filter so that at least one of the regions allows only light having a specified wavelength range to pass through; the image forming element is a condenser lens by which diffusion light which has passed through the first filter is converged to the display element, and a conjugated image provided by the first filter is formed at or around the position of the pupil of the projection means; a plurality of regions $S_y$ (Y=1–n, n≧2) are formed in the light passing plane of the second filter so that at least one of the regions allows only light having a specified wavelength range in the light which has passed through the display element, to pass through. The invention is referred to as the sixteenth invention.

There is provided a projection type display apparatus according to any one of the twelfth through sixteenth inventions, wherein the display element is transparent-scattering type liquid crystal display element, and the light source, the display element and the projection means are so arranged to form a schlieren optical system. The invention is referred to as the seventeenth invention.

There is provided a projection type display apparatus according to any one of the twelfth through seventeenth inventions, wherein the display element is a transparent-scattering type liquid crystal display element, and the surface area of the opening of the first filter region which passes a wavelength range of light providing a low scattering power is smaller than the surface area of the opening of the first filter region which passes a wavelength range of light providing a high scattering power. The invention is referred to as the eighteenth invention.

There is provided a projection type display apparatus according to any one of the twelfth through eighteenth inventions, wherein the first and second filters respectively have a spectroscopic function for three colors of R, G and B; the optical axes AR, AG and AB of the color lights of R, G and B are in the same plane so that the optical axes AR, AG and AB adjacent to each other form an angle in a range of α=1°–12°, and electric signals for color image which correspond to R, G and B are applied to each pixel in the display element. The invention is referred to as the nineteenth invention.

There is provided a projection type display apparatus according to any one of the twelfth through nineteenth inventions, wherein a pair of the first and second light converging means are arranged to correspond to three pixel elements R, G and B which correspond to a pixel for a synthesized image with colors R, G and B; an image of the virtual light source of an actual light source emitting three colors of R, G and B is formed to correspond to each color of the R, G and B pixel elements in the display element by means of the pair of first and second light converging means; the image of the virtual light source of the actual light source of three colors R, G and B is formed in the light path behind the display element after the light of the image has been reflected by a reflecting layer of the display element; and the second filter for controlling each color R, G and B is disposed so as to correspond to the image of the virtual light source. The invention is referred to as the twentieth invention.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
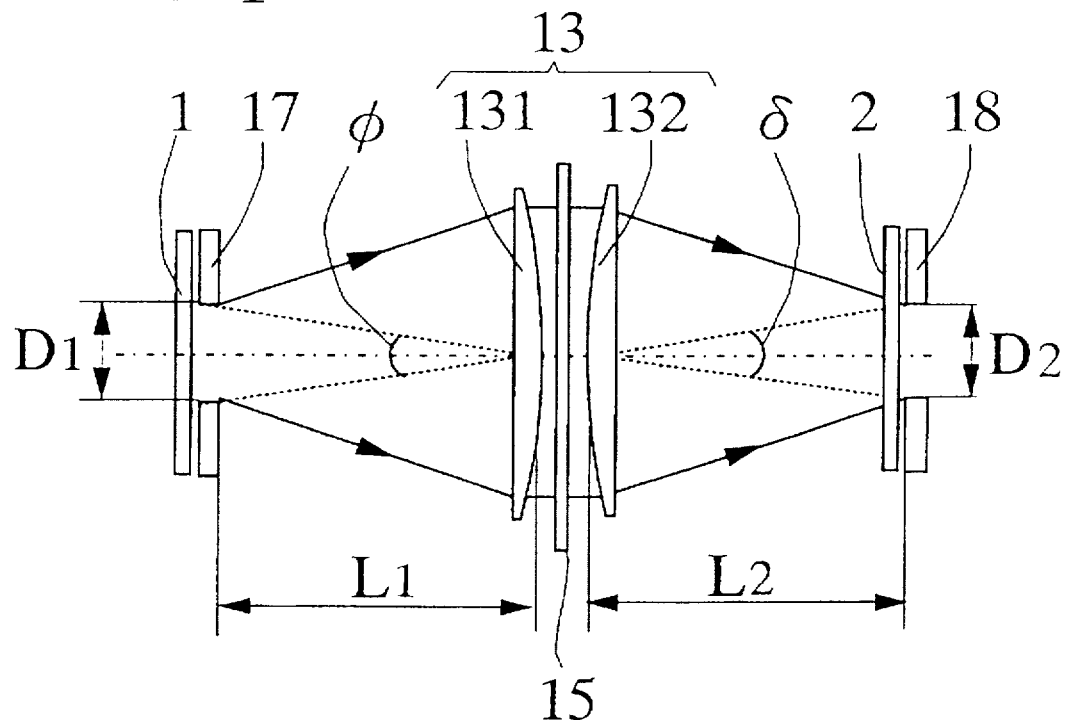
FIG. 1 is a diagram showing the first example of a positional relation between a display element and condenser lenses of the present invention.

In the following, the present invention will be described in more detail with reference to the drawings wherein the same reference numerals designate the same or corresponding parts.

The filter used for the present invention is different from a so-called color correction filter, and is to improve the color purity and the contrast ratio of a projected image in a projection type color display apparatus using a transparent-scattering type display element wherein a white color light source of high color rendering property is used as a projection light source, and color filters of RGB which are insufficient in wavelength separating characteristics are used for each pixel. Namely, each of the filters performs adjustment of the spectrum of light and light fluxes (the shape and the size) passing therethrough at the light incident side and the light emission side of the display element, whereby the color purity of the color filter having insufficient wavelength separating characteristics can be improved and a high contrast ratio can be maintained because the directivity of each color light is controlled.

The filter of the present invention can regulate both the contrast ratio and the color balance of a projected image. Generally, light from the white color light source having the full spectral range can be compensated depending on the spectral transmittance characteristics of the display element having wavelength dependence, whereby the directivity of light is regulated for each spectrum with the result of obtaining a bright projected image having a high contrast ratio. In particular, the proportion of scattering-transmitting light which contributes projection light in a scattering state (or an intermediate state) which does not reach the completely transparent state, varies depending on the directivity of light entering into a transparent-scattering type display element from a light source optical system and the collection angle in a projection optical system in a schlieren optical system. Namely, when the scattering power of the transparent-scattering type display element depends on wavelength, the filter of the present invention should be changed depending on wavelengths in consideration of the above-mentioned construction in the schlieren optical system so as to reduce the wavelength dependence.

Figure 23:
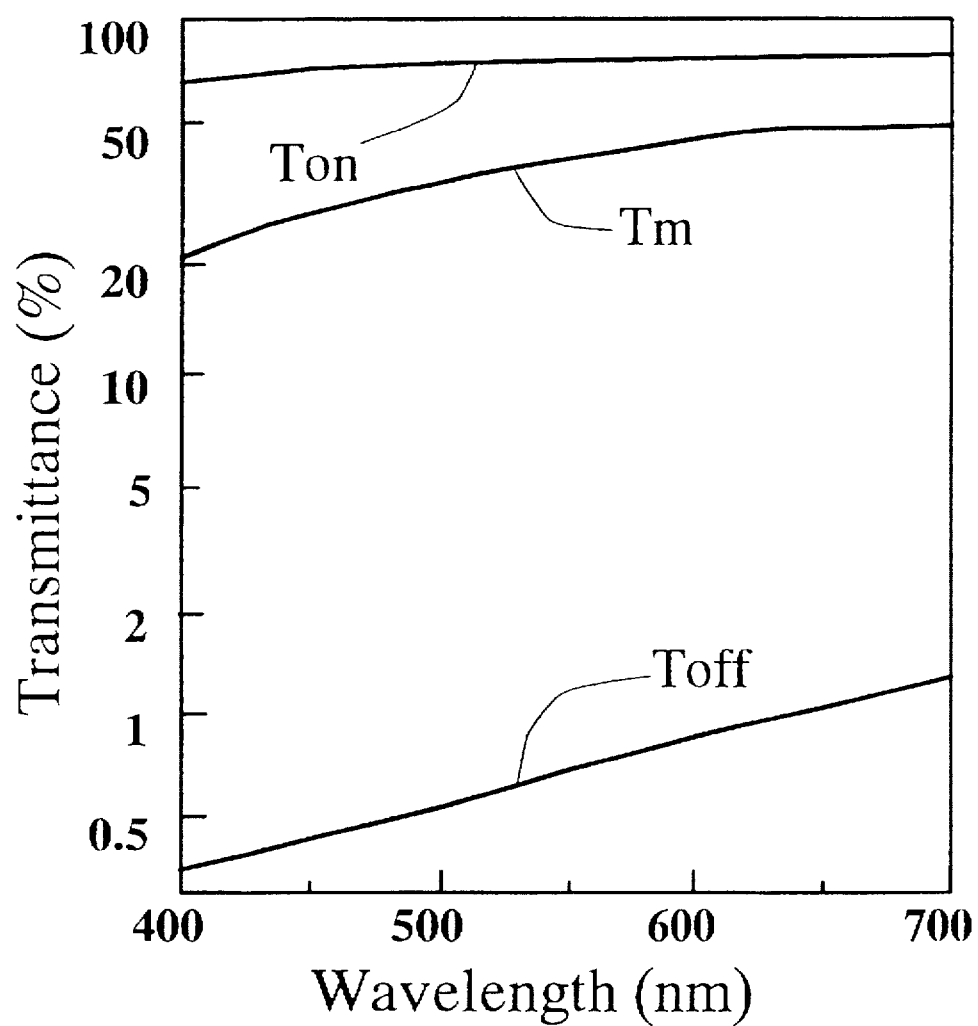
FIG. 23 is a graph showing the wavelength dependence of the transmittance of a transparent-scattering type display element in a case that a conventional projection type display apparatus is used.

As shown in FIG. 23, LCSM-LCD tends to show a low scattering power in a long wavelength region in a scattering state ($T_{OFF}$) and an intermediate state ($T_M$) which do not reach a transparent state ($T_{ON}$). Accordingly, in a conventional projection type display optical system, the transmittance of a long wavelength indicates a relatively high value.

In accordance with the construction of the projection type display apparatus of the present invention, the wavelength dependence of the transmittance can be reduced in the scattering state ($T_{OFF}$) and the intermediate state ($T_M$) which do not reach the transparent state ($T_{ON}$), and it is possible to suppress a change of color balance with respect to a white color light in a range from a dark level to a bright level, and the contrast ratio of ON/OFF of each color can be uniform.

The projection type display apparatus using the transparent-scattering type display element of the present invention is so adapted that the light source optical system produces a plurality of light fluxes having different wavelength regions; the plurality of light fluxes are made incident to a display element in common use from different directions; the light fluxes emitted therethrough are converged; a spectral means is provided at a light converging position so that the plurality of fluxes from the light source optical system, which have different wavelength regions, are separated and passed through the spectral means; and the light fluxes are projected by means of a projection optical system. The projection type display apparatus of the present invention improves the brightness, the color gamut and the contrast ratio of a projected image. In other words, a secondary light source generating light having a plurality of different wavelength regions is formed by the first filter, and in a plurality of color lights passing through the display element, the light scattered by the display element is excluded by the above-mentioned spectral means (the second filter), whereby the directivity of light for each color can be regulated and a projected image of high contrast ratio can be maintained.

The display element is so formed that it receives the plurality of light fluxes at different angles to regulate the light fluxes. Accordingly, a color display can be obtained without inviting a reduction of brightness.

In the projection type display apparatus using a transparent-scattering type display element, when the light source optical system, the projection optical system and the transparent-scattering type display element are arranged so as to satisfy the positional relation of the schlieren optical system, a projected image containing a bright portion and a dark portion (contrast) is possible. In this case, the brightness and darkness of the projected image vary depending on the dispersing angle of light emitted from the light source optical system to enter the display element and the scattering power of the display element, and further, a numerical aperture (F number) for determining the collection angle of the projection optical system. Such feature is substantially different from a transparent-absorbing type display element which determines the bright and dark portions (contrast) and which has less dependence on the optical system.

Two kinds of filters may be used in the present invention. In this case, the first filter is disposed with a space to the display element. Accordingly, light transmitting through the filter is incident as diffusion light into the display element. Accordingly, it is difficult to reflect a color distribution which exists on the filter surface, on the surface of the display element. In other words, the first filter is disposed at a virtual image forming position of the light source to regulate light quantity and light fluxes (in fact, it performs the contraction of area) for light of each wavelength region (spectrum). In the above-mentioned schlieren optical system, light from the light source is dispersed in the light path. However, there is a position where light is irradiated uniformly (i.e. the light source and a non-image forming position of virtual light source). When the display element is disposed at that position, a substantially uniform full-color display image can be obtained. Further, in a case that the conjugated image of the first filter is formed at a position by means of a condenser lens, when the second filter having the same shape as the conjugated image of the first filter is disposed at or near the position, and that position is made in coincidence with the pupil of a projection lens, a distribution of illuminance and a distribution of color on each of the first and second filters do not affect the projected image. Such illumination method to the display element is called a uniform illumination method (Koehler illumination method).

Figure 2:
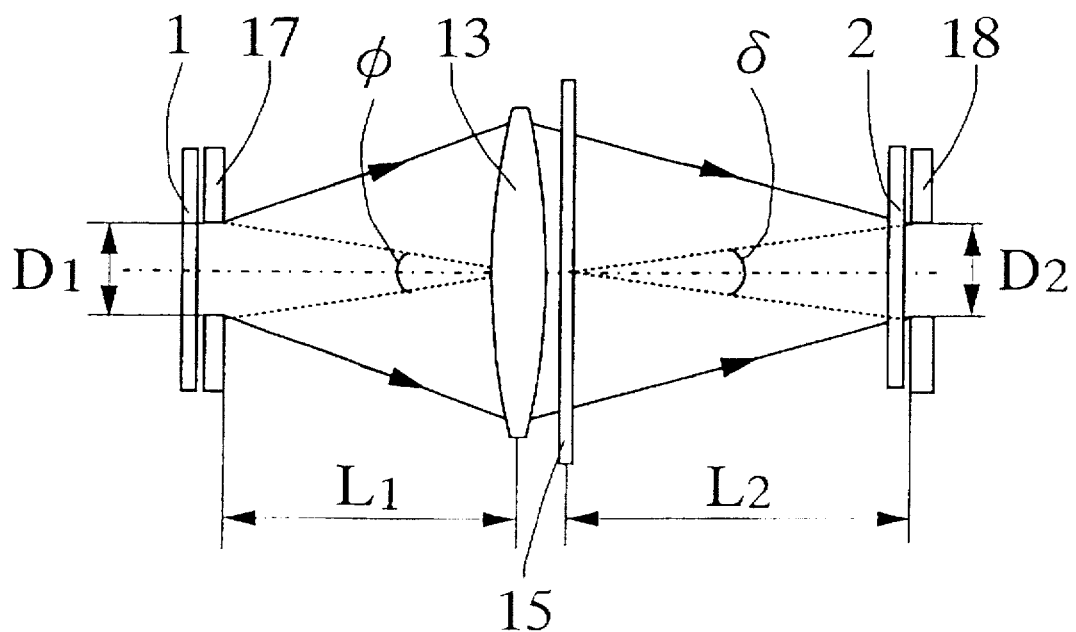
FIG. 2 is a diagram showing the second example of a positional relation between a display element and a condenser lens of the present invention.
Figure 3:
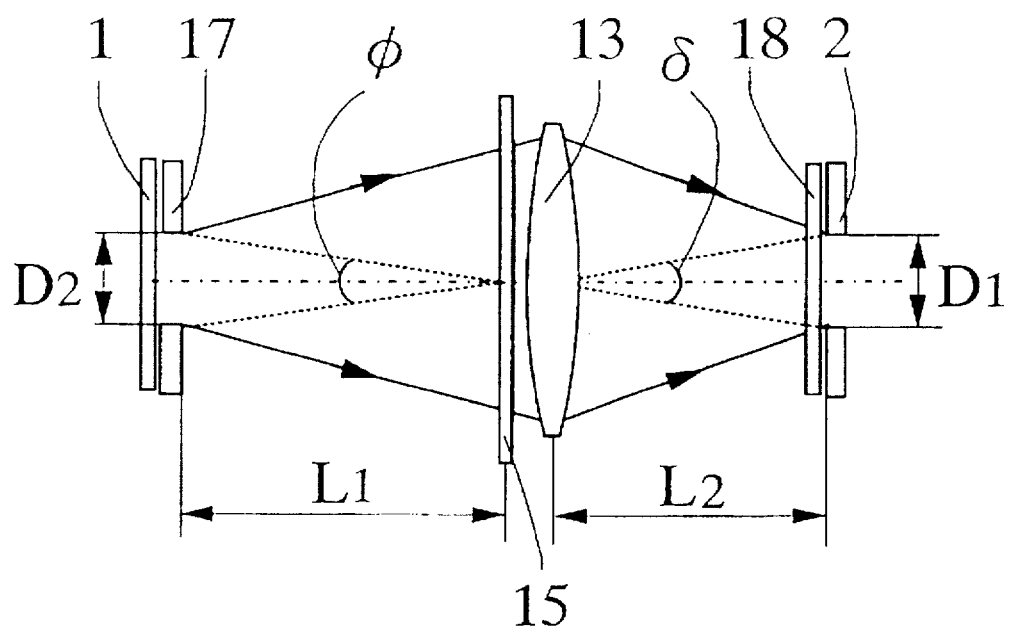
FIG. 3 shows diagram showing the third example of a positional relation between a display element and a condenser lens of the present invention.
Figure 4:
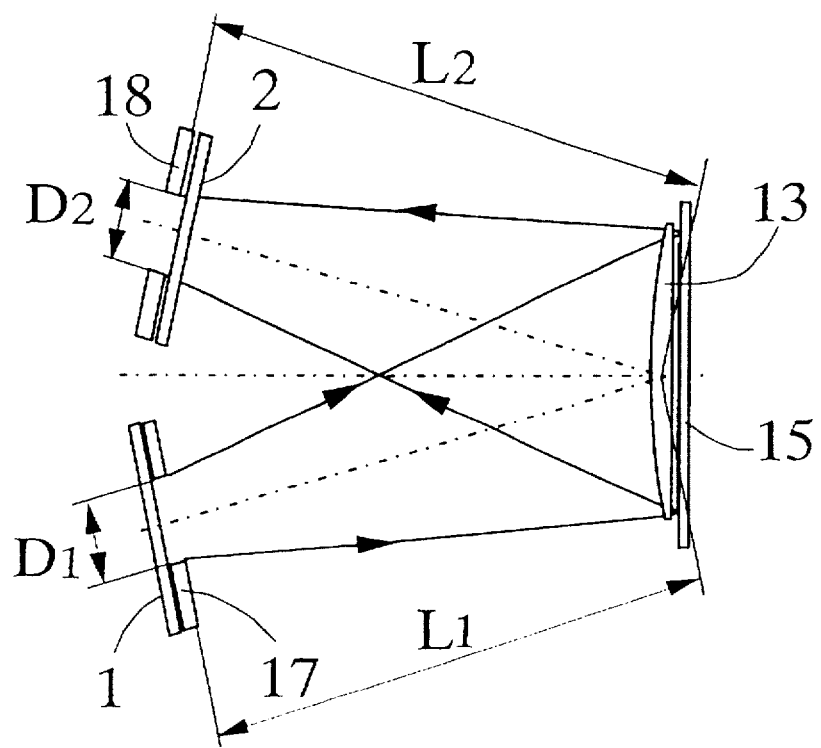
FIG. 4 is a diagram showing the fourth example of a positional relation between a display element and a condenser lens of the present invention.

FIG. 1 through 4 show some embodiments of the construction of systems according to the present invention in which the position of a condenser lens or lenses are different. FIGS. 1 through 3 show a case that the transparent-scattering type display element is used in a transmissive mode, and FIG. 4 shows a case that the transparent-scattering type display element is used in a reflection mode wherein a reflecting layer is formed inside or a non-light incident surface side of the display device so that light reciprocates in a light modulation functioning layer (which causes the scattering of light). In the Figures, a lens or lenses are used as an optical element or elements for forming the conjugated image of a light emission source in the light source optical system or a secondary emitting light source. However, an image forming effect by an ellipsoidal mirror or a spherical mirror may be used instead of the lens.

Structural element in FIGS. 1 through 4 will be described. There are a first filter 1 provided with a first aperture 17, a first condenser lens 131 (used for forming substantially parallel light), a liquid crystal display element 15, a second condenser lens 132, and a second filter provided with a second aperture 18. It is not always necessary to use two condenser lenses a single lens such as a condenser lens 13 shown in FIG. 2 through 4 may be used. The first and second filters may be separated and disposed in the vicinity of the first and second apertures respectively. On the other hand, the former may be formed integrally with the latter respectively.

In the above-mentioned structures, the directivity (dispersing angle) of light incident to the transparent-scattering type display element is determined depending on the size and the shape of the first filter which forms the luminescent source in the light source optical system and a secondary emitting light source (virtual light source), and the positional relation to the transparent-scattering type display element or the condenser lens. Further, the directivity (collection angle) of emission light to be projected to a screen or the like through the projection optical system, the emission light being a part of light transmitting through the transparent-scattering type display element, is determined depending on the second filter having the aperture which has substantially the same shape as the conjugated image of the luminescent source in the light source optical system or the secondary emitting light source and the positional relation to the transparent-scattering type display element or the condenser lens.

According to the present invention, in the projection type display apparatus using a transparent-scattering type display element in which color filters are provided for each pixel is used, the spectrum of each color R, G, B and the directivity of incident light to the transparent-scattering type display element in the basic structure of the above-mentioned schlieren optical system and the spectrum and the directivity of emission light to be projected through the transparent-scattering type display element to the screen or the like are adjusted, whereby the contrast ratio and the color gamut of a projected image of the transparent-scattering type display element can be improved.

Specifically, a filter having such a construction that three kinds of spectral elements for controlling each color of RGB are spatially arranged at the position of the second aperture having the opening of the same shape as the conjugated image of the first aperture, which is formed by the first aperture which is an emission light source in the light source optical system or a secondary emitting light source, and the condenser lens, is used.

According to the present invention, the projection type display apparatus using a transparent-scattering type display element in which the scattering characteristic depends on wavelengths, is used, and the directivity of light incident to the transparent-scattering type display element in the basic construction of the above-mentioned schlieren optical system and the directivity of emission light to be projected through the transparent-scattering type display element to the screen are adjusted so that the directivities vary depending on wavelengths, whereby the wavelength dependence in the scattering characteristic of the transparent-scattering type display element is compensated, and the wavelength dependence of the contrast ratio of a projected image and a change of color balance in an intermediate tone of the image can be reduced.

Specifically, the size and the shape of the first filter as a luminescent source in the light source optical system or a secondary emitting light source and the size and the shape of the second filter having the aperture portion which has the same shape as the conjugated image of the first filter which is formed by the condenser lens as an image forming element, are changed.

The present invention is generally applicable to an optical system in which a display element comprising pixels is used and a white color light source is used as a light source for illumination. Specifically, a commercially available liquid crystal display element (LCD), in particular, a transparent-scattering type liquid crystal display element without using a polarization plate is preferably used.

As LCD of a transparent-scattering type (light scattering type), several systems such as DS-LCD, LCD of liquid crystal phase changing mode and so on are reported. In the several systems, the above-mentioned LCSM-LCD is preferably used because it can be driven with a low voltage ($\leq 10$ V) and has a high scattering power. Methods of preparing and constructions of the LCSM-LCD are described in the U.S. patents which are referred to hereinbefore.

Figure 18:
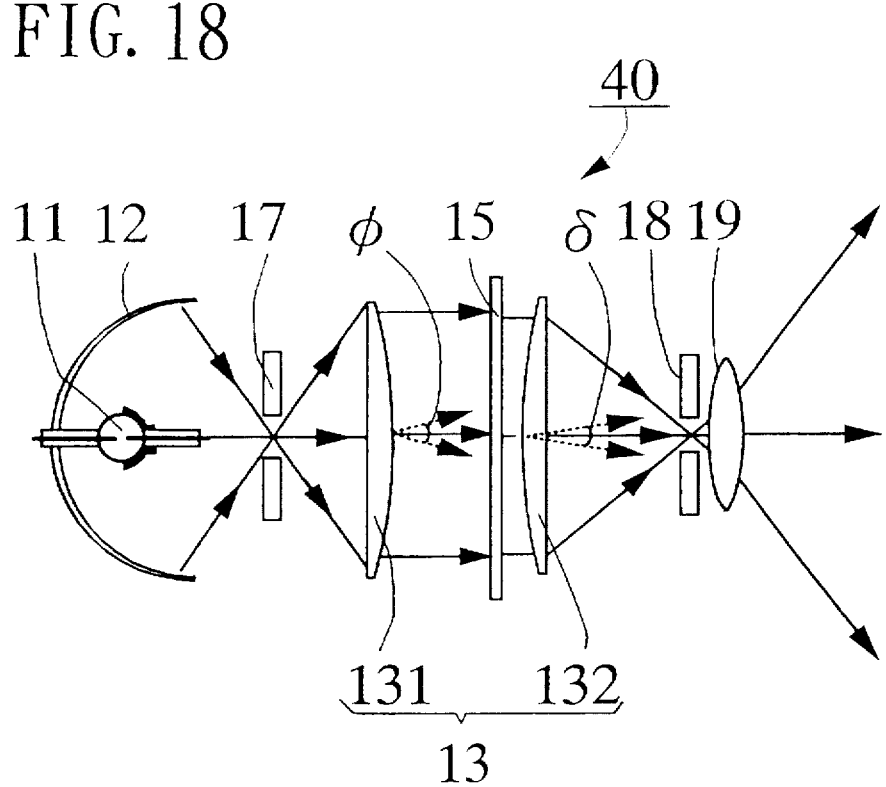
FIG. 18 is a diagram in plane view of a conventional projection type color display apparatus.
Figure 19:
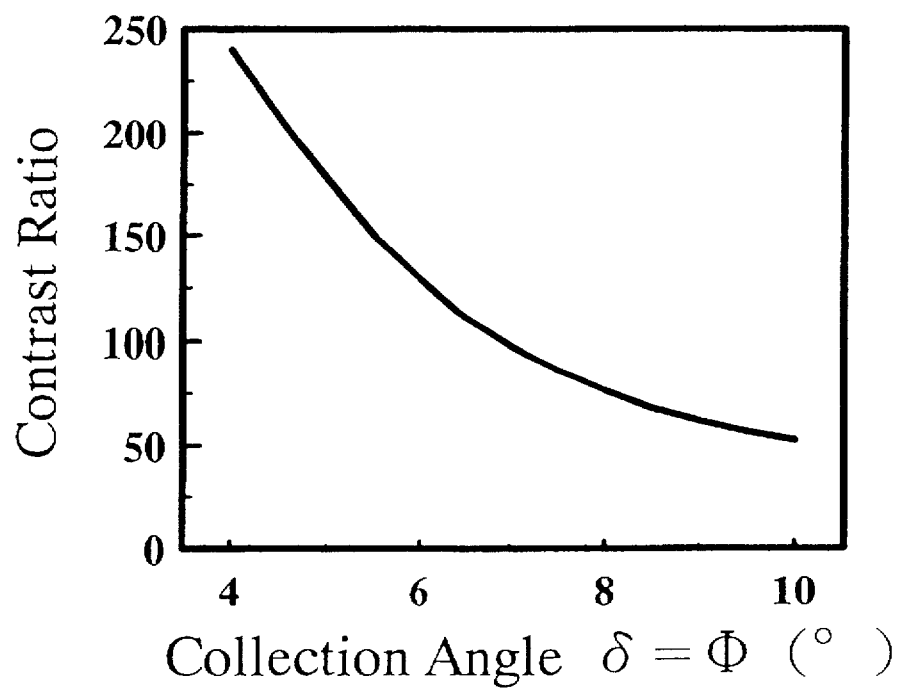
FIG. 19 is a graph showing a relation between the collection angle and the contrast ratio of the projection type color display apparatus.

FIG. 19 is a diagram showing the contrast ratio of a projected image ($T_{ON}/T_{OFF}$ which represents the ratio of transmittance $T_{ON}$ (when a voltage of 7 V is applied) to $T_{OFF}$ (when no voltage is applied)) which is obtained when the projection type display apparatus using LCSM-LCD having a transparent-scattering type operation mode is used, and the optical system in the entire system shown in FIG. 18 described in paragraphs 69–75, in Japan Telecommunication & Information Academy EID92-125 (1993–02) (i.e. the projection type display apparatus 40) is used.

The projection type display apparatus 40 has a light source optical system including an ellipsoidal mirror 12, a light source 11 and a first aperture 17. The light fluxes from the light source are controlled with a light paralleling lens 131. A condenser lens 132 is disposed behind a liquid crystal optical element 15 and the light path. A second aperture 18 is disposed at a position in the light path where the conjugated image of the first aperture 17 is formed. Further, a projection optical system including a projection lens 19 is disposed.

In FIG. 19, the collection angle indicates the directivity of projection light which will be described later. When the collection angle becomes smaller (it means approaching the formation of parallel light), the contrast ratio becomes high, and when the converging angle becomes larger, the contrast ratio decreases.

Figure 25:
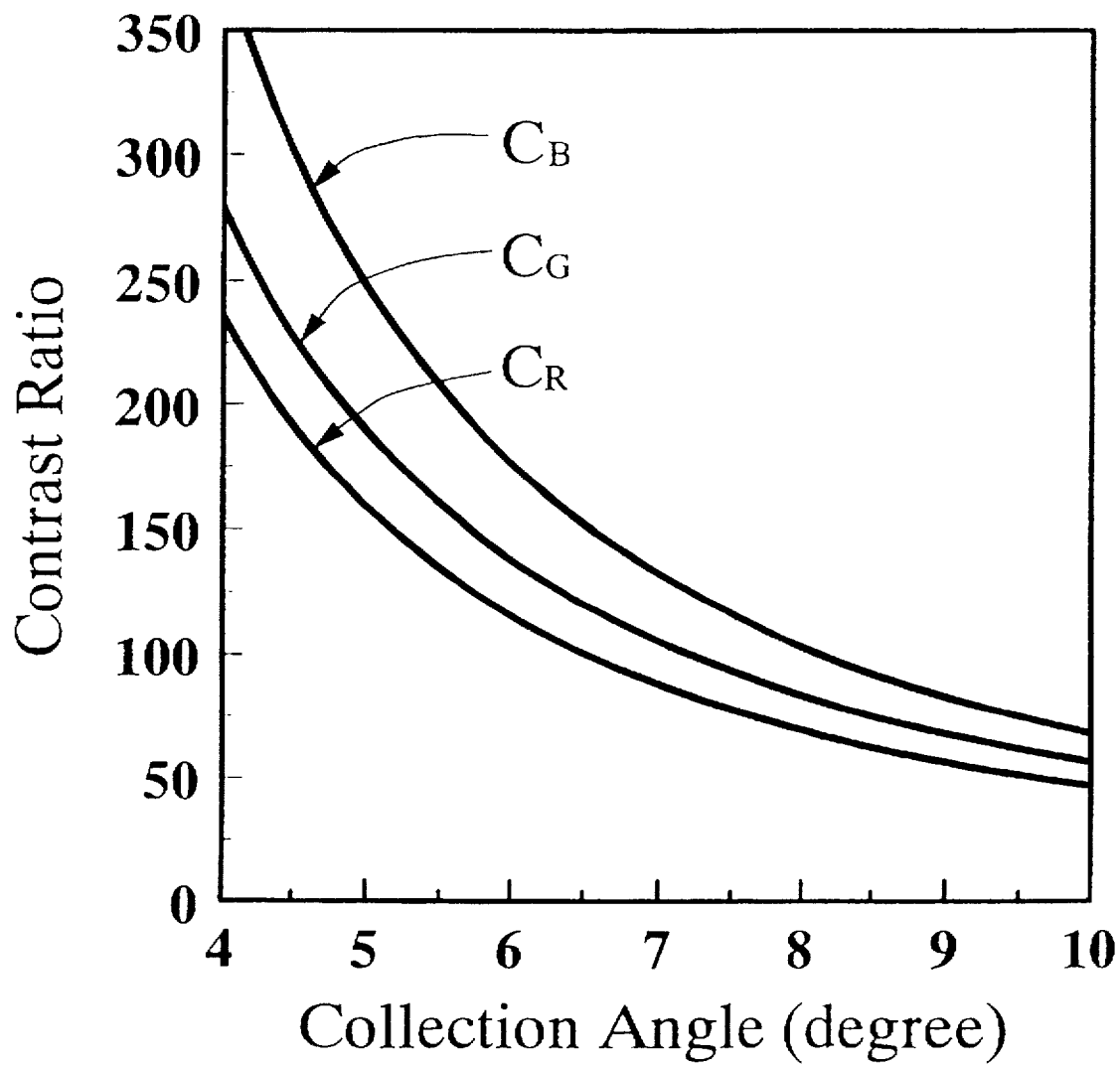
FIG. 25 is a graph showing the wavelength dependence of the contrast ratio and the converging angle dependence in a case that a conventional projection type display apparatus of transparent-scattering type is used.

FIG. 25 shows how the contrast ratio ($T_{ON}/T_{OFF}$ represents the ratio of transmittance $T_{ON}$ (when a voltage of 7 V is applied) to transmittance $T_{OFF}$ (when no voltage is applied)) of a projected image depends on the collection angle ($C_R$ indicates the contrast ratio of R at a wavelength of 610 nm; $C_G$ indicates the contrast ratio of G at a wavelength of 540 nm, and $C_B$ indicates the contrast ratio of B at a wavelength of 470 nm) in a case of using the projection type display apparatus 40.

$C_R$, $C_G$ and $C_B$ are obtained by measuring the main wavelengths of each band region of R, G and B. In FIG. 25, it is understood that the dependence of the contrast ratio on the collection angle varies depending on wavelengths. Accordingly, when LCSM-LCD is used, the contrast ratio is generally low in a long wavelength region. In particular, a projected image in a dark level does not exhibit a gray color but exhibits a brown color. As shown in FIG. 23, an intermediate region which does not reach a transparent state ($T_{on}$) exhibits a high transmittance ($T_m$) in a long wavelength region in the same manner as the scattering state ($T_{off}$).

On the other hand, the contrast ratio depends on the directivity of incident light to the display element and the directivity of projection light, and the contrast ratio indicates a high value as the directivity is high. Further, the transmittance ($T_m$) in the intermediate region indicates a low value as light has a higher directivity, in the same manner as the transmittance ($T_{off}$) in the scattering state. Accordingly, it is possible to reduce the wavelength dependence of the contrast ratio of a projected image and a change of color balance in the intermediate region by providing an optical system so that projection light having a long wavelength region has a high directivity.

In FIG. 1 through 4, $D_1$ designates the aperture diameter of the first filter, which is determined by the size and the shape of the luminescent source in the light source optical system or the secondary emitting light source, and $D_2$ designates the aperture diameter of the second filter having the opening portion having the same shape as the conjugated image, which is disposed at a position where the conjugated image of the first filter is formed. In this case, when it corresponds to the light emitting part of the luminescent source, or when light emitted from the luminescent source is converged to a focal point by means of an ellipsoidal mirror or the like and an aperture is disposed at the focal point to form a secondary emitting light source, $D_1$ indicates the diameter in average. Namely, when the entire surface area of the light emitting part (which corresponds to the surface area of the opening portion of the first aperture in FIGS. 1 through 4) is $S_{one}$, the following formula is given:

$$D_1 = (4 \times S_{one}/\pi)^{1/2} \qquad \text{(Formula 1)}$$

In this case, when there is a plurality of light emitting parts, or the opening portion of the first filter comprises a plurality of separate areas or opening portions $s_x$ (X=1–n, n≧2), $S_{one}$ is approximated by the total surface area $\Sigma s_x$.

Also, in the second filter located at the position where the conjugated image of the light emitting part of the first filter is formed, when the total surface area of the opening portion of the second filter is represented by $S_{two}$, $D_2$ is expressed by formula 2 where $S_{two} = \Sigma s_y$ (Y=1–n, n≧2) and $s_y$ is defined in the same manner as $s_x$.

$$D_2 = (4 \times S_{two}/\pi)^{1/2} \qquad \text{(Formula 2)}$$

A dispersing angle ø which represents the directivity of light emitted from the light source optical system to enter into the transparent-scattering type display element is approximated by the following formula wherein $L_1$ represents a shorter one of the distance between the light emission part or the condenser lens and the transparent-scattering type display element:

$$\tan (\phi) = D_1/L_1 \qquad \text{(Formula 3)}$$

A collection angle δ which represents the directivity of emission light to be projected to a screen or the like through the projection optical system, the emission light being a part of light transmitting through the transparent-scattering type display element, is approximated by the following formula where $L_2$ represents a shorter one of the distance between the second filter or the condenser lens and the transparent-scattering type display element:

$$\tan (\delta) = D_2/L_2 \qquad \text{(Formula 4)}$$

Accordingly, in order to change the directivities ø, δ of incident light to the transparent-scattering type display element and projection light depending on wavelength regions, any one of $D_1$, $L_1$, $D_2$ and $L_2$ related to Formula 3 and Formula 4 is changed depending on the wavelength regions.

Accordingly, in order to change the directivities ø, δ of incident light to the transparent-scattering type display element and projection light depending on each color of R, G and B, any one of $D_1$, $L_1$, $D_2$ and $L_2$ related to Formula 3 and Formula 4 is changed for each of R, G and B. Further, a spectroscopic element for controlling the spectrum of each color of R, G and B should be disposed at the opening portion corresponding to $D_1$ or $D_2$. In the present invention, use of the first filter and the second filter means that $D_1$ and $D_2$ are substantially adjusted for each of R, G and B to thereby improve the directivity and the color purity of R, G or B.

When the brightness, namely, projection efficiency is to be maintained without decreasing the contrast ratio of a projection image, it is preferable to determine $D_1$, $L_1$, $D_2$ and $L_2$ so that the dispersing angle $\phi$ and the collection angle $\delta$ are made substantially equal. For the adjustment of $L_1$ or $L_2$, it is necessary to change the focal distance of an optical lens, and accordingly, the construction of the entire system becomes further complicated. In particular, in order to form a color separating and synthesizing optical system for three colors of R, G and B, three kinds of optical lenses are needed. On the other hand, for the adjustment of $D_1$ or $D_2$, use of the structural elements of the first filter or the second filter is sufficient.

When the scattering power of the transparent-scattering type display element used is low, it is preferable to use such a structure that the first filter or the second filter comprise respectively a plurality of separated regions or opening portions $s_x$, $s_y$ or such a structure that the openings have an elongated outer periphery because the contrast ratio can be increased in comparison with use of a single circular aperture. Here, the aperture and the filter are formed integrally.

Figure 24:
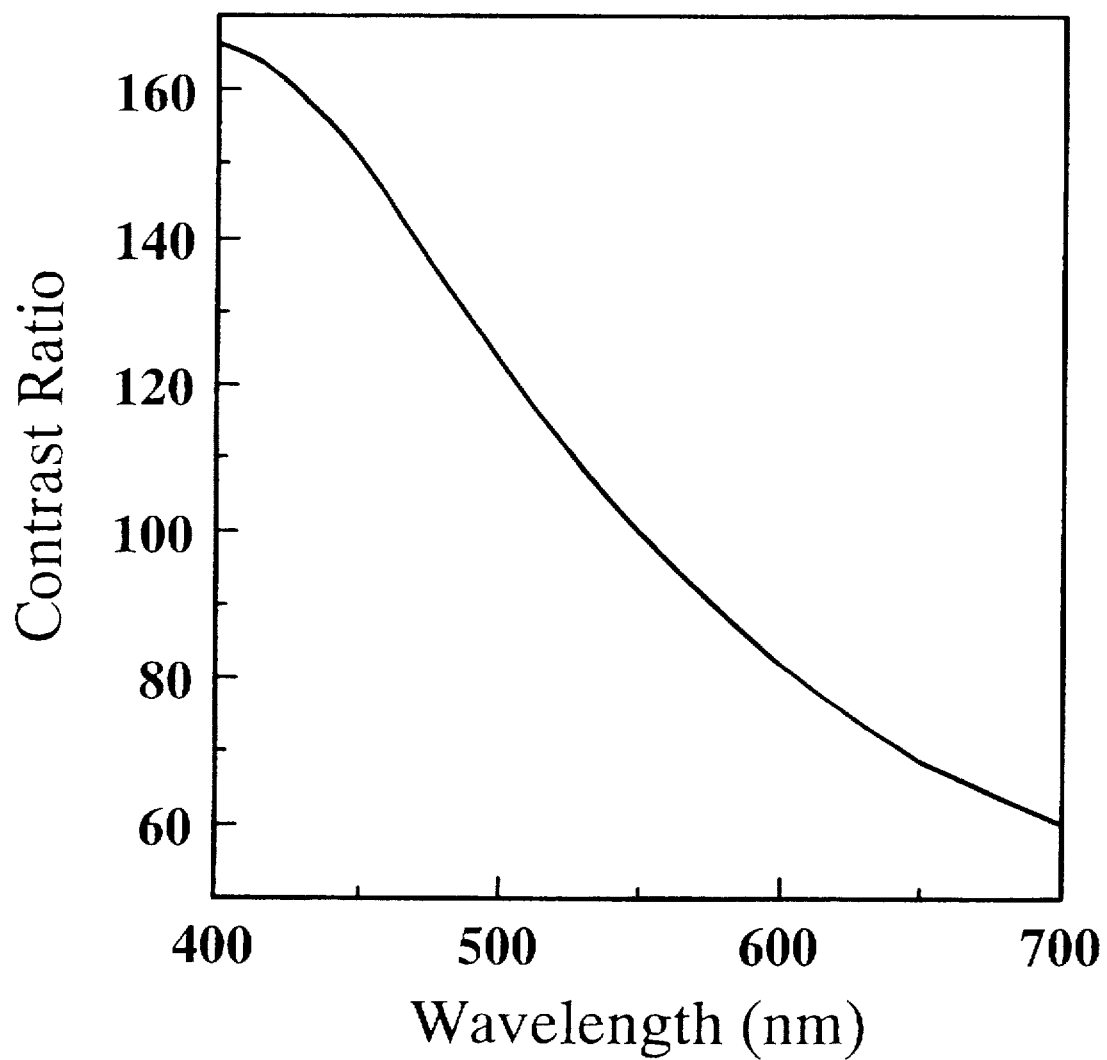
FIG. 24 is a graph showing the wavelength dependence of the contrast ratio of a transparent-scattering type display element in a case that a conventional projection type display apparatus is used.

When LCSM-LCD showing the tendency of the wavelength dependence on the transmittance and the contrast ratio or the collection angle dependence as shown in FIGS. 23, 24 and 25 is used, the light passing surface of the first filter 1 and the second filter 2 should have a plurality of regions having different spectrum transmitting characteristics (transmitting and cutting-off wavelength). For instance, when light is separated to have three wavelength regions of R, G and B wherein any two wavelength regions are determined to be a wavelength region A and a wavelength region B each having the central wavelength $\lambda_A$ or $\lambda_B$, and supposing that the surface area of each of the wavelength regions in the light passing surface of the filters is $K_A$ or $K_B$, it is preferable to form the first filter and the second filter so as to satisfy the relation of Formula 5.

$$0.8 \leq (K_A/K_B)^{0.5} * (\lambda_A/\lambda_B) \leq 1.2 \quad \text{(Formula 5)}$$

In the description of the present invention, R indicates a wavelength band region of about 580–670 nm; G indicates a wavelength band region of about 500–570 nm, and B indicates a wavelength band region of about 420–500 nm. A wavelength region to be cut off may be shifted in consideration of other optical elements to be used. Further, although it is necessary to provide spaces between the wavelength band regions in order to improve the color purity, an amount of the spaces should be adjusted in consideration of the entire system.

In the next section, description will be made as to a construction according to the present invention in which video signals corresponding to each color of R, G and B are applied to a reflection type liquid crystal display element; a single color pixel comprises a set of pixel elements of R, G and B which are arranged in a spatially adjacent relation and there are a first light converging means and a second light converging means operable in association with pixels. Further, description will be made as to incident light for the R, G, B pixel element set.

Figure 26:
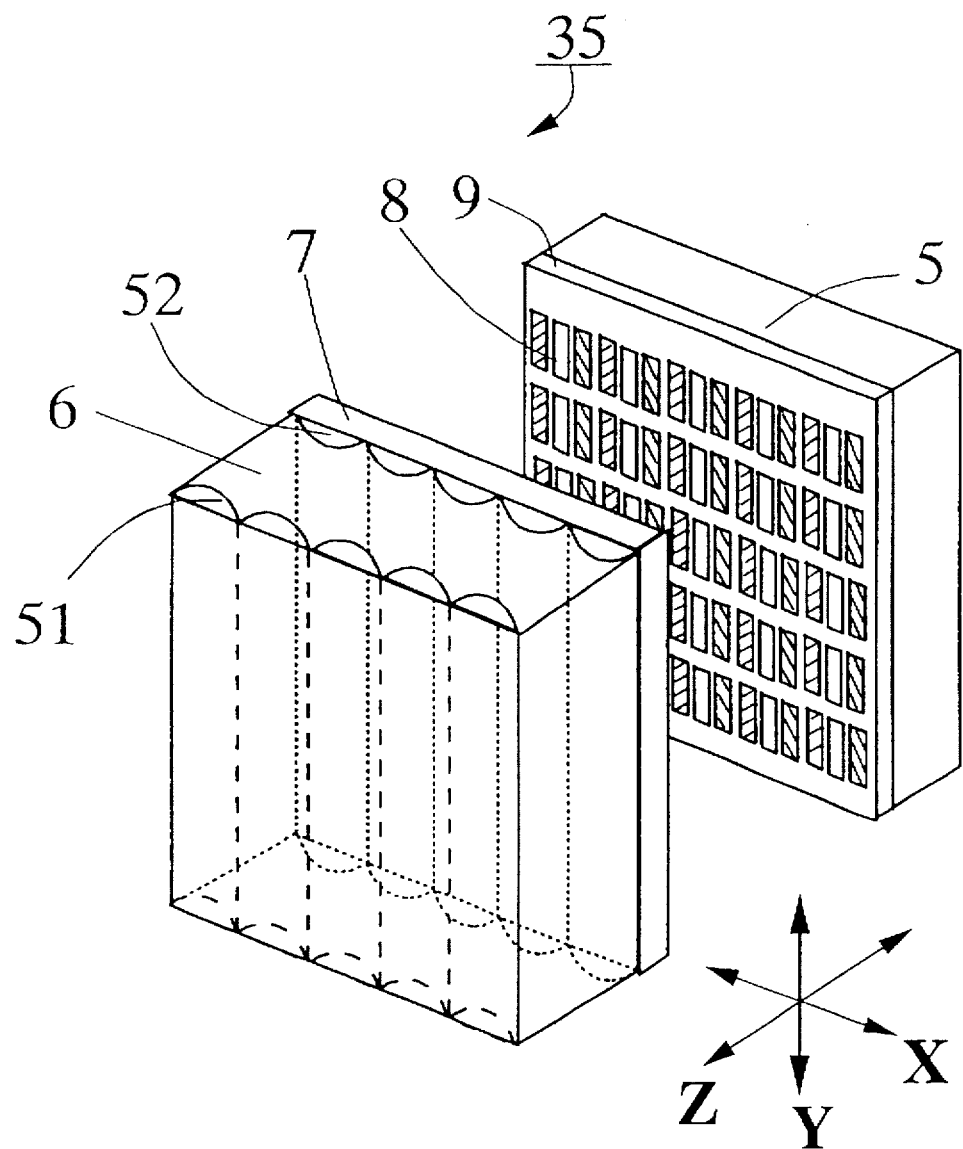
FIG. 26 is a diagram in a perspective view of substrate arrangement of the reflection type display element according to the third embodiment of the present invention.

FIGS. 26 (a perspective view of substrate arrangement) and 27 (cross-sectional view taken along an axis of X-Z) show a microlens array in a cylindrical shape as the first light converging means and the second light converging means, the microlens array constitutes a lenticular structure. The same effect can be achieved by using such a structure that a microlens array is used for the first and second light converging means, which has the function of converging light symmetrically with respect to a Z axis, and which has not a cylindrical shape for each of the R, G and B pixel elements, or a structure that a micro-converging mirror array having a cylindrical shape is disposed as the second light converging means at the side of the reflecting substrate to thereby form a lenticular structure. In any case, a pair of the first and second light converging means are disposed in correspondence to a set of R, G and B pixel elements which forms a single color pixel.

Figure 28:
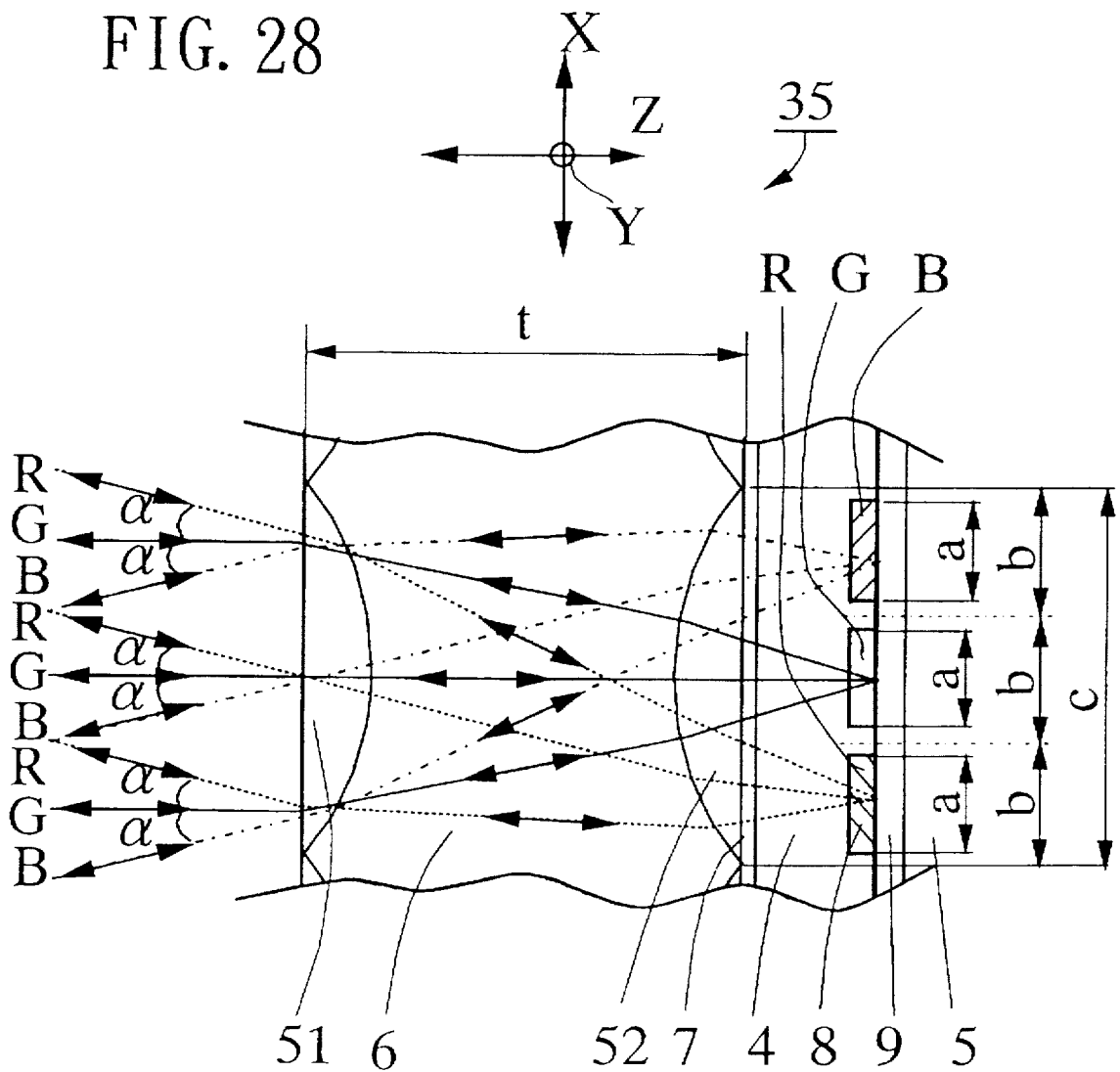
FIG. 28 is a partially enlarged cross-sectional view of the reflection type display element according to the third embodiment of the present invention.
Figure 29:
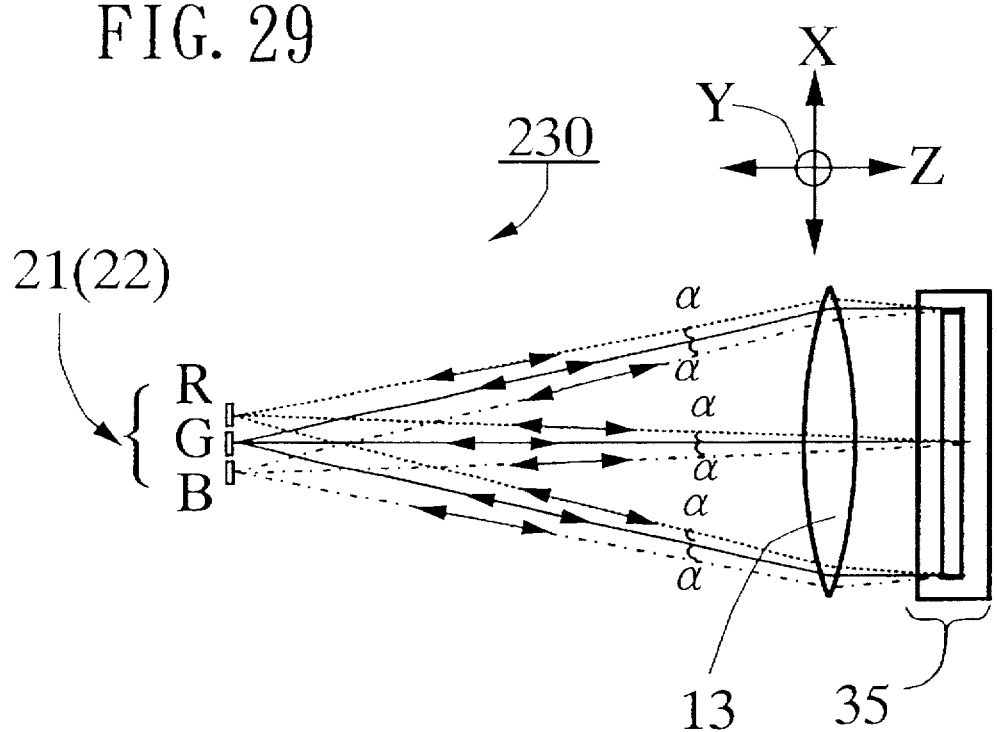
FIG. 29 is a diagram in plane view of the projection type color display apparatus according to the third embodiment of the present invention.

FIG. 28 is an enlarged cross-sectional view of basic structural elements wherein the principal light beams of incident light and emission light for each color of R, G and B are shown. Namely, the optical axis of incident light to the reflection type liquid crystal display element is different for each of R, G and B color lights, and the optical axis of each of the color lights is inclined by an angle $\alpha$ in a plane along an X-Z axis as shown in FIG. 29. In FIG. 29, the optical axis of R and B lights is inclined by $\pm \alpha$ with respect to a G light.

The inclination angle $\alpha$ of the optical axis of R, G or B in the element and an inclination angle $\alpha_0$ of the optical axis of R, G or B outside the element has a relation of $\sin(\alpha_0) = n \cdot \sin(\alpha)$ according to the Snell's law of refraction wherein n represents the refraction index of a light transmitting substrate at the light incident side. In this description, $\alpha$ is used in consideration that the above-mentioned inclination angles are the same. However, the inclination angles in the element and outside the element are in fact different in accordance with the Snell's law.

As a result, the G light entering in perpendicular to the reflection type liquid crystal display element in the plane along the X-Z axis is converged by the first light converging means to the central area of the three pixel elements of R, G and B. On the other hand, incident lights of R and B which have an inclination angle of $\pm \alpha$ with respect to the G light are respectively converged to edge portions of the pixels.

In this case, the first light converging means having the focal distance $F_1$ and the second light converging means having the focal distance $F_2$ wherein $F_1$ and $F_2$ are substantially equal, are arranged to be substantially equal to the distance t between the main points. Since the thickness of an electro-optical functioning layer 4 is usually in a range of several μm to several 10 μm, it is sufficiently thin in comparison with the thickness of the light transmitting substrate at the light incident side, which has a thickness of about 0.2–2 mm. Accordingly, the focal distance t between the first and second light converging means 1, 2 can be considered to be the same as the thickness t of the light transmitting substrate at the light incident side.

The width of each element (such as a microlens or a light converging mirror) of the light converging means in the plane of X-Z axis is equal to the width C of the R, G and B pixel element set, and FIG. 28 shows that the widths b between the pixel elements R, G and B are equal and the length a of a pixel electrode which determines the width of display portion comprising the R, G and B pixel element set is substantially equal. The light fluxes of each of R, G and B are introduced to the pixel electrode corresponding to each of R, G and B. In this case, the inclination angle $\alpha$, the distance t ($=F_1=F_2$) between the main points of the first and second light converging means and the width b of the R, G and B pixel elements should satisfy the relation of formula 6.

$$b = t \times \tan(\alpha) \quad \text{(Formula 6)}$$

where $\alpha$ represents an angle of incident light in the substrate. The widths wR, wG, wB (wRGB is used in this explanation) of the light fluxes in the plane of X-Z axis which are converted by the light converging means can be expressed by formula 7.

$$wTGB = t \times \tan(\phi RGB \times) \quad \text{(Formula 7)}$$

Accordingly, in order to avoid such a disadvantage that any of color lights R, G, B is converged to a pixel element to which video signals corresponding to the color light are applied to thereby cause deterioration of the color purity, wRGB is preferably less than b. Further, in order to avoid a loss of light at a portion other than operating portions, wRGB should be less than a.

$$wRGB \leq b$$

$$wRGB \leq b \quad \text{(Formula 8)}$$

From formula 6 to Formula 8, it is understood that the dispersing angle øRGBx of each color light R, G or B should be smaller than the inclination angle α of the optical axis of the each color. The incident angle of each color light R, G or B and the reflection type liquid crystal display element should be so designed as to satisfy the above-mentioned conditions.

A case that the optical axis is inclined in the plane of X-Z axis has been explained. However, when a lenticular structure is used wherein the first light converging means and the second light converging means perform light converging function in only the plane of X-Z axis, incident light causes specular reflection at the reflecting layer 9 in the plane of Y-Z axis, which is the same as the case without providing the light converging means.

On the other hand, in a case of using a microlens array wherein the first light converging means and the second light converging means isotropically collect light in the direction of the optical axis, light beams trace the same locus as in FIG. 28 in the plane of Y-Z axis which is perpendicular to the X-Y axis when the optical axis of incident light is in parallel to the Z axis. Further, when the optical axis of incident light has a certain inclination angle with respect to the Z-axis, the microlens array of the first light converging means is preferably disposed at a shifted position of c/2 with respect to the microlens array of the second light converging means and the reflecting pixel electrode.

Figure 30:
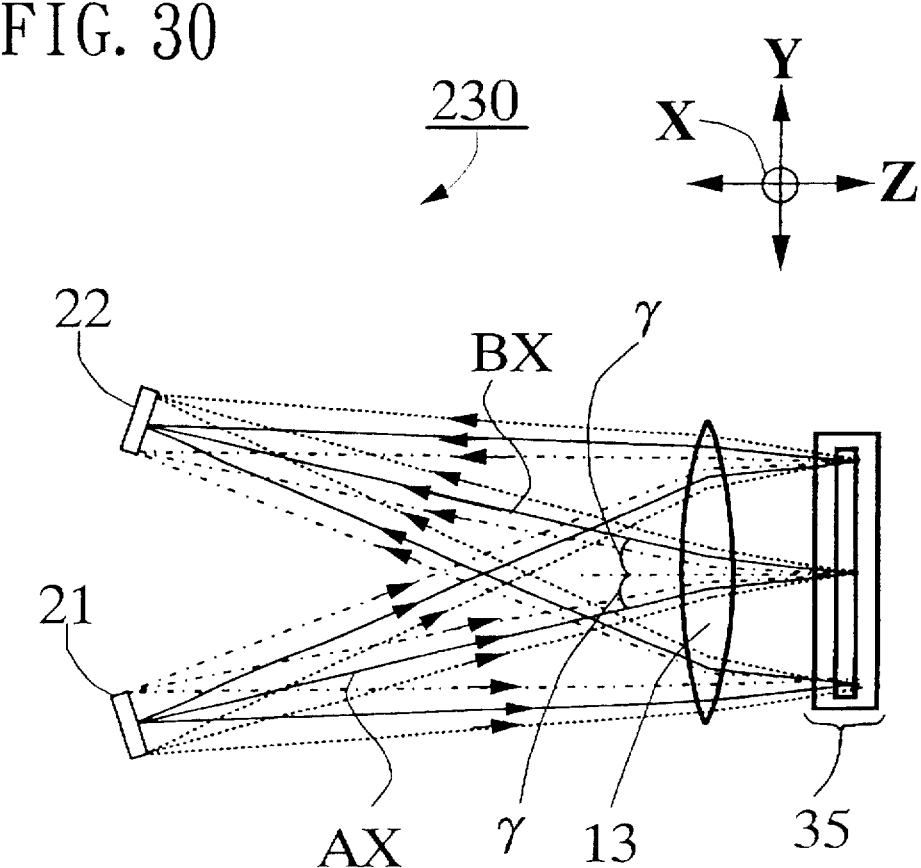
FIG. 30 is a diagram in side view of the projection type color display apparatus according to the third embodiment of the present invention.

FIG. 29 and 30 show examples of arrangement of the optical system producing incident lights of R, G and B as shown in FIG. 28.

Figure 31:
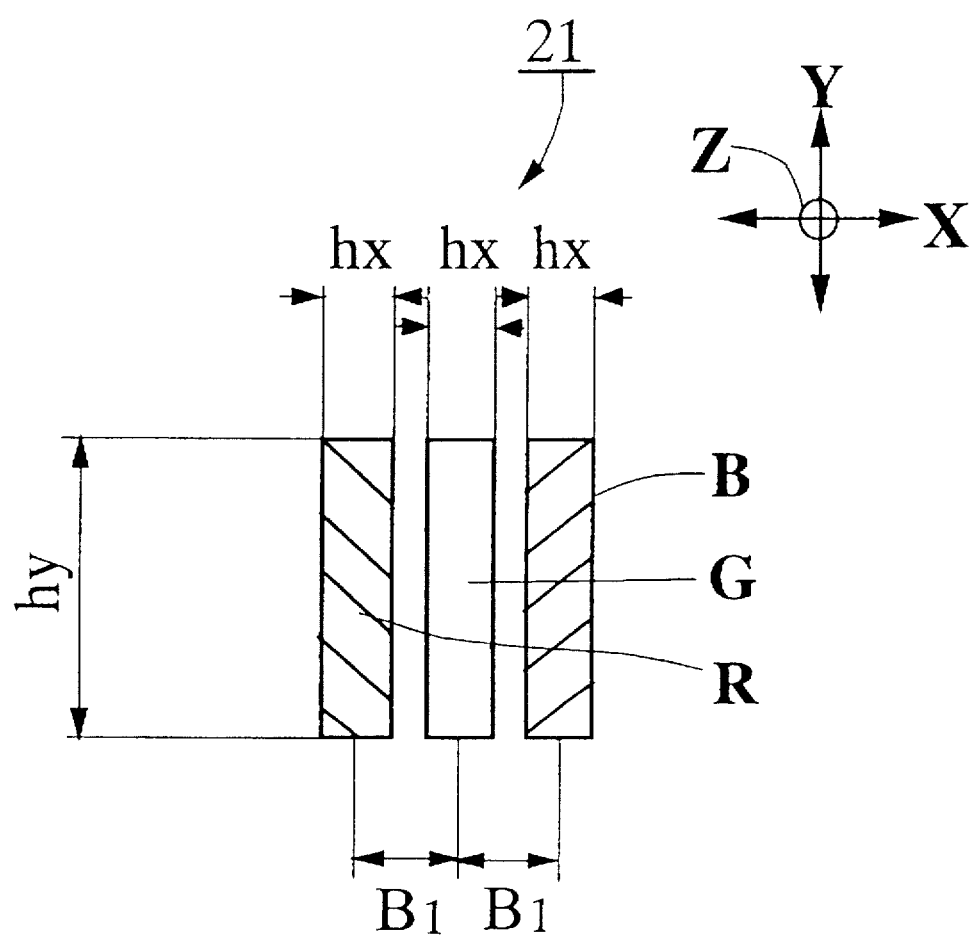
FIG. 31 is a plane view of a filter as the fifth example of the present invention.

A light source for emitting three colors (corresponding to an element designated with a reference numeral 21 in FIGS. 29 and 30) in which R, G and B are in a spatially separated positional relation as shown in FIG. 31 is disposed at the light incident side of a reflection type liquid crystal display element 35 in the plane of X-Z axis of the display element. Light emitted from the light source is formed into a parallel light by means of a condenser lens arranged in front of the reflection type liquid crystal display element, and is incident with an inclined optical axis for each of R, G and B into the reflection type display element. The color lights R, G and B which are specularly reflected by the reflecting layer are collected by the same condenser lens 13, and then, an image of the light source of three colors 22 (the image is substantially the same as the image of the original light source of three colors and conjugated images of R, G and B are spatially separated) is formed as shown in FIGS. 29 and 30.

In this embodiment, the reflection type liquid crystal display element have the first and second light converging means each having a lenticular structure which extends along the Y axis direction as shown in FIG. 26. In this case, the light source of three colors of RGB is disposed apart from the condenser lens 13 by about the focal distance of F.

The conjugated image of the light source of RGB shown in FIG. 31 is formed by the first light converging means at pixel electrodes of RGB in the vicinity of the electro-optic functioning layer. Accordingly, the formulas described hereinafter which correspond to Formulas 6 through 8 on the before-mentioned b and wRGB are applied to hx and B in order to efficiently converging each color of R, G and B to the pixel electrodes of R, G and B.

In particular, when a transparent-scattering type liquid crystal is used as an electro-optic functioning layer for the reflection type liquid crystal display element, the color purity can be improved and a high contrast ratio can be achieved since a schlieren optical system is formed for each color of R, G and B and scattering light can effectively be removed. Specifically, when the transparent-scattering type liquid crystal is in a transparent state a filter which has a shape corresponding to the light source of three colors of R, G and B as shown in FIG. 31 and which allows to pass only the spectra of R, G and B, is disposed at a position where the conjugated image of the light source of three colors of R, G and B is formed at the light emission side of the display element by means of the condenser lens 13.

The relation of dispersing angles øRGBx (in the plane of X-Z axis) and øRGBy (in the plane of Y-Z axis) of each color of R, G or B, the inclination angle α of the optical axis of each color, the size and the shape of the light source of RGB shown in FIG. 31, to the focal distance F of the condenser lens 13 is summarized in Formula 9 where hx and hy respectively represent the length in the direction of the X axis and the Y axis of the light source of R, G and B, and B represents the distance in the direction of X axis between the centers of adjacent light areas of R, G and B.

$$\tan(\phi RGBx) = hx/F$$

$$\tan(\phi RGBy) = hy/F$$

$$\tan(\alpha) = B/F \quad \text{(Formula 9)}$$

The surface area of the lights of R, G and B is expressed by hx·hy, and the mean value øRGBm of the dispersing angle of incident light of each color of R, G and B is defined in Formula 10.

$$\tan(\phi RGBm) = 2(hx \cdot hy)^{1/2}/F \quad \text{(Formula 10)}$$

Accordingly, the dispersing angle øRGBx and the mean value of dispersing angle øRGBm are determined by selecting the length hx in the direction of the X axis and the length hy in the direction of the Y axis of the light emitting portion and the focal distance F of the condenser lens.

In the following, description will be made as to an embodiment of the light source for emitting three color lights R, G and B and a constructural for removing efficiently scattering lights of R, G and B.

Figure 14:
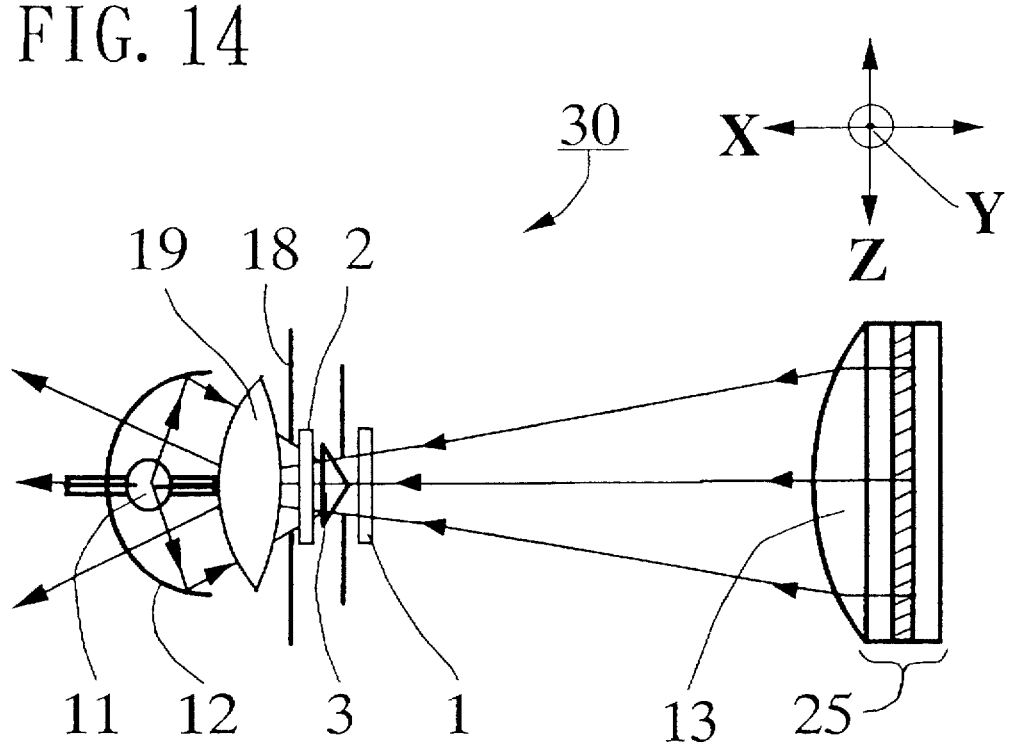
FIG. 14 is a diagram in plane view of the projection type color display apparatus according to the second embodiment of the present invention.
Figure 15:
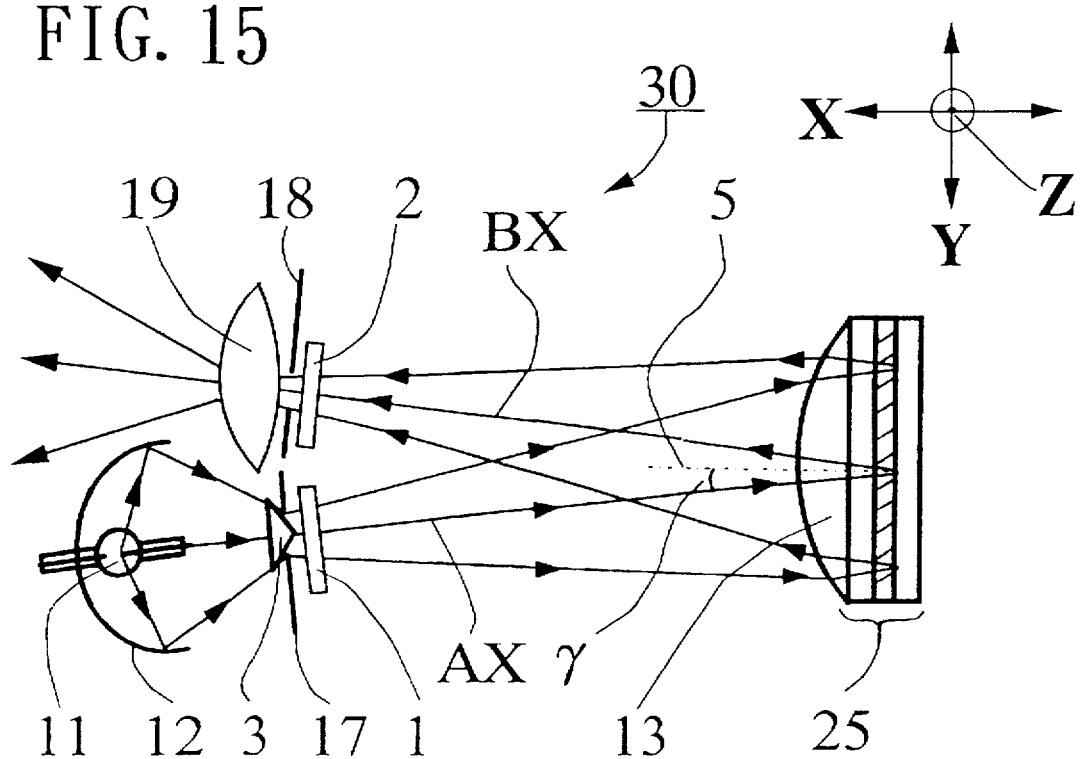
FIG. 15 is a diagram in side view of the projection type color display apparatus according to the second embodiment of the present invention.
Figure 16:
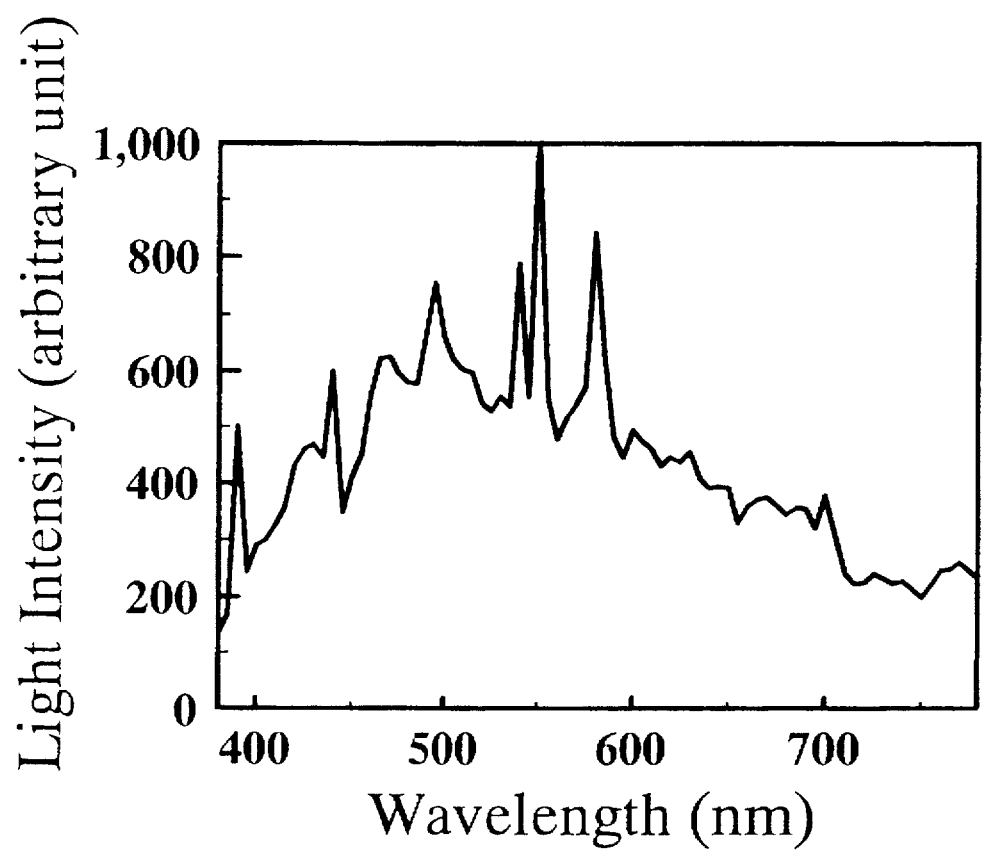
FIG. 16 is a graph showing the emission spectrum of a metal halide lamp as the projecting light source in the projection type color display apparatus.
Figure 17:
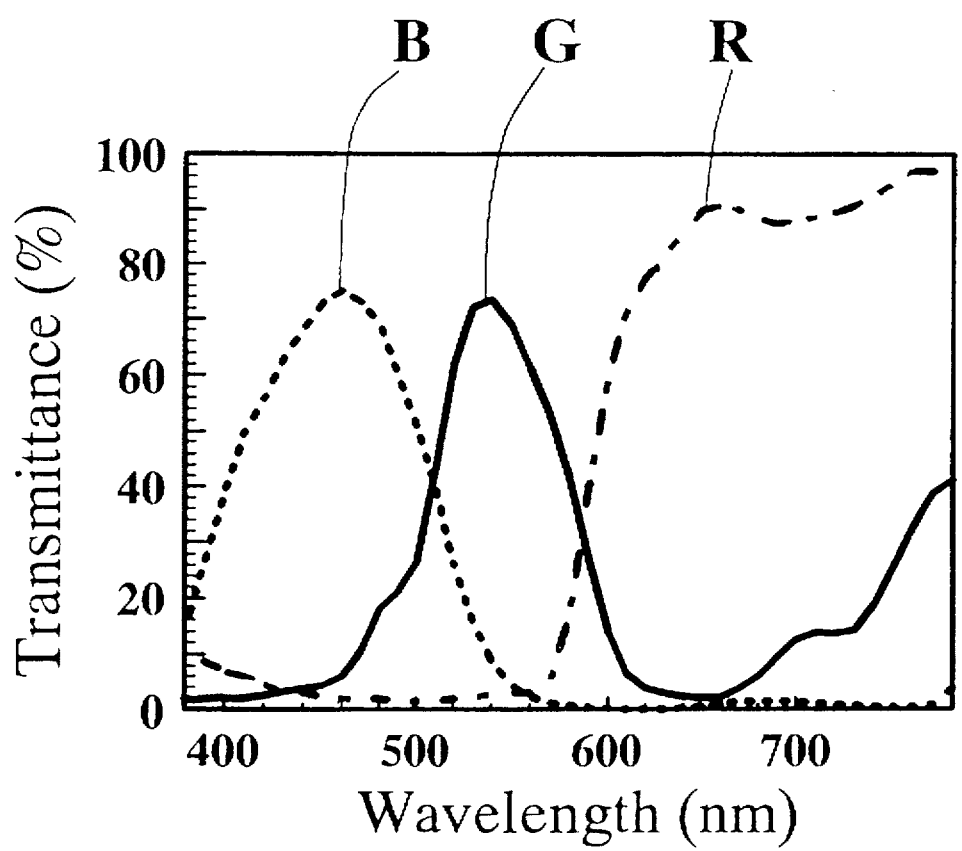
FIG. 17 is a graph showing the spectral transmittance of a pigment dispersing type color filter used for a display element in the projection type color display apparatus.

The first embodiment is shown in FIGS. 14 and 15. A first filter 1 and a second filter 2 each of a transparent type and having an opening portion of a size and a shape as shown in FIG. 31 and having the before-mentioned spectral characteristic, are respectively disposed in the vicinity of a first aperture 17 and a second aperture 18. A white color light emitted from a light source 11 as a white color light source is converged by a converging mirror 12 and the light forms a secondary light source of three colors R, G and B by the first filter 1. The color lights RGB which pass the display element by the condenser lens 13 are converged to form the conjugated image of the first filter 1. The second filter 2 is disposed at the position where the conjugated image of the first filter 1 is formed. Then, light scattered by the display element is removed for each color of R, G and B, and a projection image of high contrast ratio can be obtained.

In this case, means for changing the length in the direction of Y axis of the opening portions of the first and second apertures 17, 18 may be provided so that the length hy of the first and second filters 1, 2 can be adjusted. It is possible to change only the mean value of dispersing angle øRGBm while the dispersing angle øRGBx is unchanged.

A light source actually used is a luminescent body having a finite length of light emission. Accordingly, it is possible to adjust the brightness by changing the length hy. Namely, in bright circumstances, hy is increased to obtain a bright projection image whereby a high contrast ratio can be maintained with respect to background light. On the other hand, in dim circumstances, hy is decreased to reduce the dispersing angle øRGBm and the collection angle δ=øRGBm, whereby a projection image of high contrast ratio can be realized although the brightness is more or less decreased.

Figure 10:
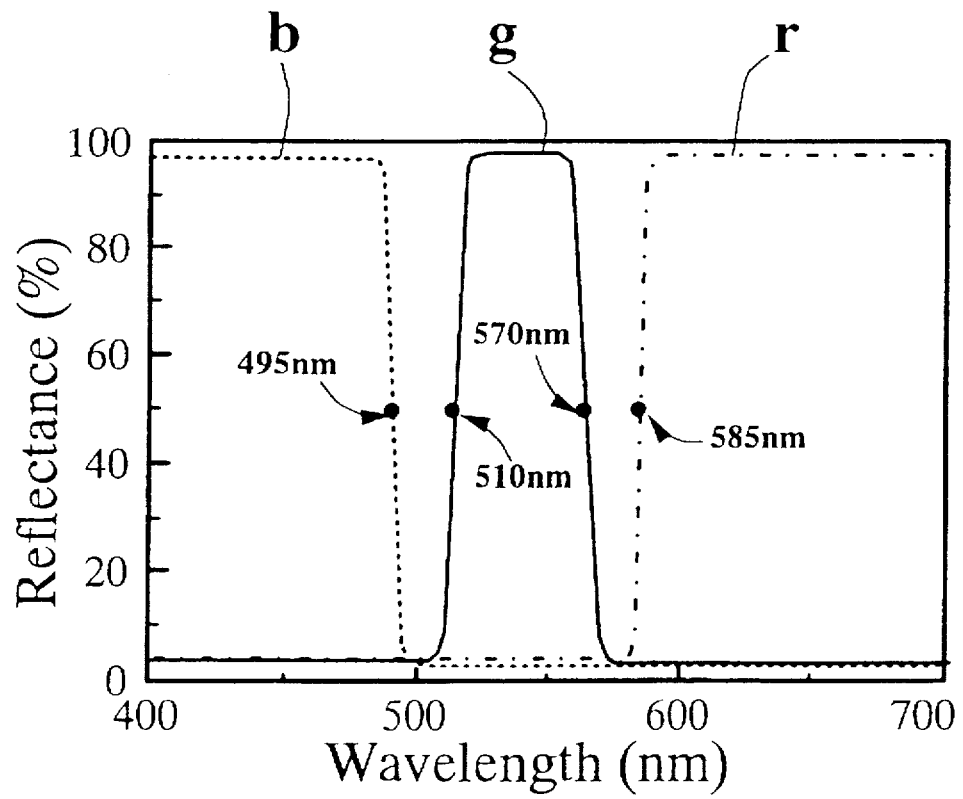
FIG. 10 is a graph showing the spectral reflectance characteristic of the filter of the second example.
Figure 32:
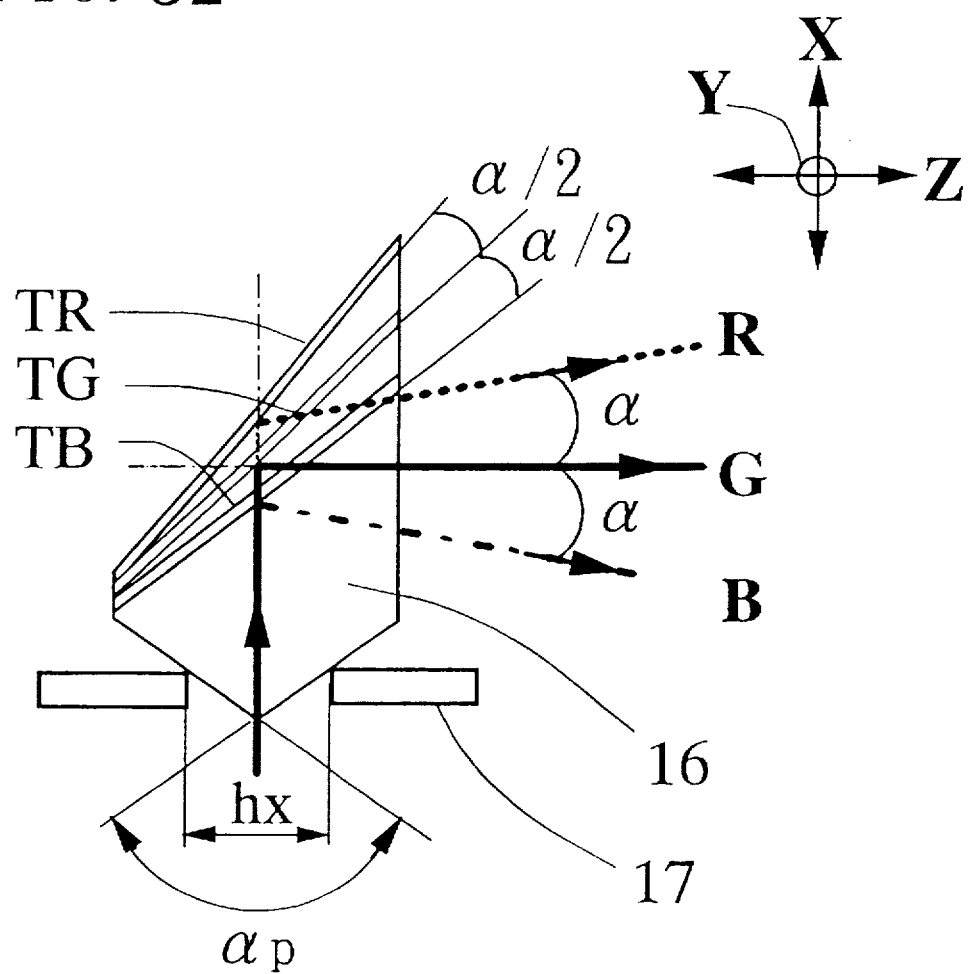
FIG. 32 is a plane view of an optical element with a filter as the sixth example (type α/2) of the present invention.
Figure 33:
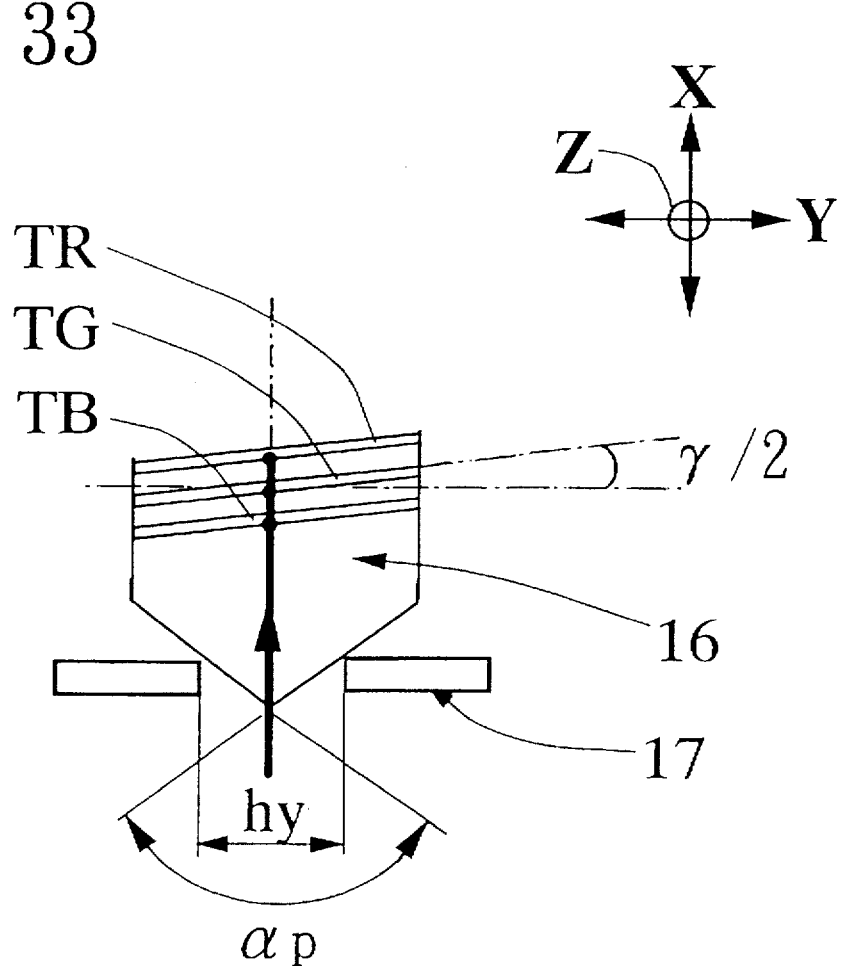
FIG. 33 is a plane view of an optical element with a filter as the sixth example (type γ/2) of the present invention.

FIGS. 32 and 33 show the second embodiment of construction concerning the light source system. A dichroic mirror having mirror surfaces TR, TG and TB each reflecting each color R, G or B, which is used instead of the first filter 1 as shown in FIGS. 14 and 15, is disposed at an angle of α/2 in the plane of X-Z axis. An optical element 16 is used wherein each of the dichroic mirror surfaces TR, TG, TB is arranged at the light emission side of a prism portion. As a result, a white color light emitted through the first aperture 17 is reflected and forms spectral lines at the dichroic mirror surfaces to thereby form light sources of R, G and B to be emitted to the reflection type liquid crystal display element. FIG. 10 shows the spectral characteristics of color lights R, G and B by the dichroic mirror. With the structure wherein the optical element 16 comprising a dichroic mirror (which has mirror surfaces TR, TG and TB each arranged with different inclination angles) and a cone-like prism which are formed integrally with the dichroic mirror is disposed near the first aperture 17, and when the opening of the first aperture 17 is formed to be a rectangular shape of hx·hy, the light source of RGB corresponding to the element 21 (in FIG. 29, it is disposed at a position overlapping with the element 22) in FIG. 30 is recognized when the light source system is watched from the side of the display element. In FIGS. 32 and 33, a convex cone-like prism having an apex angle of less than 180° is used. However, a concave cone-like prism having an apex angle of more than 180° may be used. In this case, the second filter to be disposed at the side of the projection optical system may have the same shape as in FIG. 31.

When the dichroic mirror described with reference to the second embodiment concerning the light source system is used, efficiency of utilizing light can be increased in comparison with the first embodiment.

In the above-mentioned description, the shape hx, hy of the light sources of three colors R, G, B are supposed to be substantially the same for each of the colors, namely, the dispersing angles of emission light of R, G and B are substantially the same with respect to each of the colors. However, the shape hx, hy of the light sources of three colors RGB may be different from each other with respect to each of the colors, namely, the dispersing angle of incident light and the collection angle of the projection optical system may be different with respect to each of the colors R, G and B.

When the contrast ratio of each of colors R, G and B is to be adjusted or the color balance of R, G and B is to be adjusted, it is preferable that the shape hx, hy of the light sources of three color lights R, G, B is different from each other for each of the colors.

Now, the present invention will be described in further detail with reference to embodiments based on simulated calculation about total optical performance including experimental LC/PC data. However, it should be understood that the present invention is by no means restricted to such specific embodiments or examples.

(EMBODIMENT 1)

Figure 5:
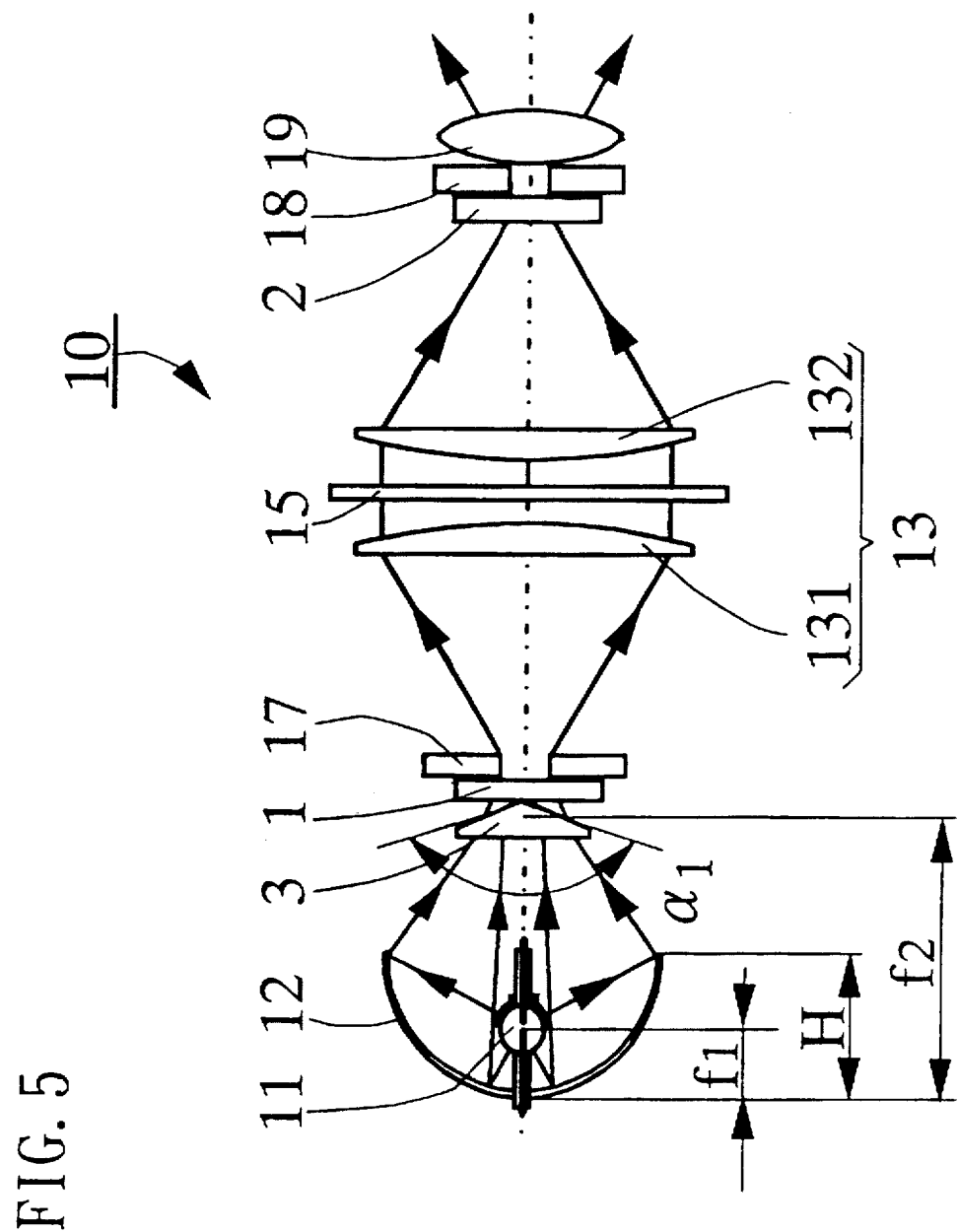
FIG. 5 is a diagram showing the first embodiment of a projection type color display apparatus of the present invention.

FIG. 5 shows a projection type color display apparatus 10. In this embodiment, a light source 11 is disposed at the first focal point of an ellipsoidal mirror 12 (or spheroidal mirror). Light emitted from the light source 11 is reflected by the ellipsoidal mirror 12 to enter into a convex type cone-like prism 3 located at the second focal point from the side of its flat surface. The incident light is refracted at the flat surface and propagates in the prism. The light is further refracted at a cone surface of the convex type cone-like prism 3 and emits from a cone surface. Since the light is subjected to refraction and transmission in the prism, a distribution of light having an orientation angle after the emission of the light is changed. Then, the light is incident into a first condenser lens 131 to be formed into substantially parallel light, and the parallel light is incident into a transparent-scattering type liquid crystal display element 15. A part of the light as non-scattered light which has passed the liquid crystal display element 15 without scattering in a functioning layer of the liquid crystal display element 15 is substantially converged to the position of a projection lens 19 by means of a second condenser lens 132 to be projected to a screen (not shown). On the other hand, scattering light scattered by the liquid crystal display element 15 deviates from the regular light path and removed by, for instance, the second filter 2 whereby the scattered light is not projected on the screen.

The opening of a first aperture 17 and the opening of a second aperture are respectively arranged in the vicinity of the first filter and the second filter. The filters used in this embodiment are so adapted that the surface area of light path and the quantity of light passing therethrough can be adjusted depending on wavelength regions (spectra) of light. As the light source 11 used in this embodiment, a metal halide lamp and a xenon lamp both of a discharge luminescent type and a halogen lamp of a filament luminescent type may be used. Any of lamps has a light shielding part such as an electrode in the light source portion, a bulb glass, a temperature keeping film, a filament and so on, which reduces an amount of emission light in a range near an orientation angle in the direction parallel to the optical axis of light emitted from the light source. Also, with respect to reflection light from the ellipsoidal mirror 13, there is a small amount of emission light in a range near the orientation angle in the direction parallel to the optical axis.

Figure 21:
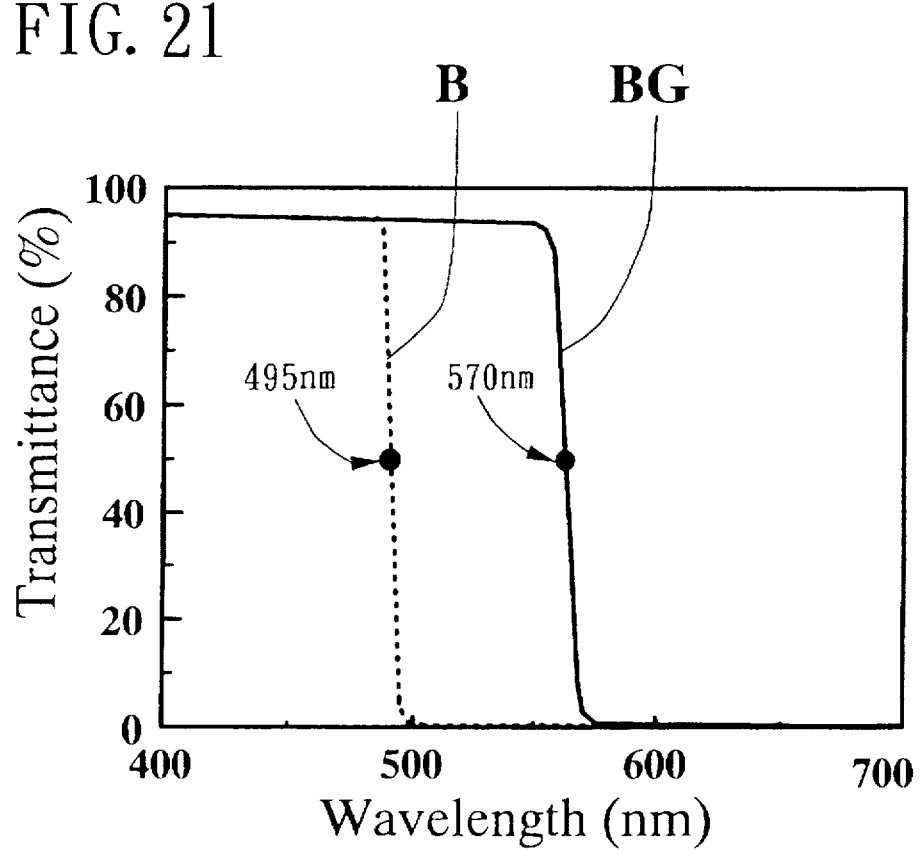
FIG. 21 is a graph showing the spectral transmittance characteristic of the filter as the third example.

As a result, in a conventional case shown in FIG. 21 which does not have the cone-like prism 13, the quantity of light emitted with an angle of less than about 10° with respect to the optical axis at the second focal point of the ellipsoidal mirror 12 was small whereby a shadow is produced around the center of the transparent-scattering type display element 15. On the other hand, when the cone-like prism is used, the orientation angle of light flux is changed due to the refraction of light at the interface of the prism to compensate a shortage of light emitted at an angle of less than about 10° with respect to the optical axis, and ununiformity of light intensity at a position near the center of the transparent-scattering type display element can be corrected to obtain uniform light intensity.

The cone-like prism may be disposed other than the arrangement as shown in the drawing in such a manner that the flat surface of the prism faces the light emission side and the cone surface faces the light incident side. In this case, the filter of the present invention can be disposed at the flat surface side whereby an integrated structure can easily be formed. Further, it is advantageous when the numerical aperture is adjusted with an iris diaphragm.

An ellipsoidal mirror is usually used as the light converging mirror in the light source optical system. However, in principle, it is sufficient that it possesses function to form a secondary-emitting light source. For instance, there is a combination of a parabolic mirror and a condenser lens. As the ellipsoidal mirror, it is not always necessary to use such one having a smooth curved surface, but a multi-mirror type ellipsoidal mirror wherein a number of small flat mirror portions are assembled to form a single ellipsoidal mirror as a whole, may be used. Further, an ellipsoidal mirror in combination of two or more kinds of ellipsoidal mirror surfaces or a composite mirror in combination of a spherical mirror and an ellipsoidal mirror may be used. Further, a flat ellipsoidal mirror wherein a cross-section of the ellipsoidal mirror exhibits a substantially elliptic line in a plane wherein the optical axis corresponds to a normal line, in consideration of the shape of the aperture and the shape of the liquid crystal display element.

Elements which constitute this embodiment (FIG. 5) will be described. An active matrix driving substrate having TFTs in correspondence to ITO electrodes for pixel and a color filter having R, G and B regions for pixels are formed. A counter substrate comprising a glass substrate provided with TFTs, wiring portions and a black matrix, and an ITO transparent electrode formed on the glass substrate is used. The substrates are assembled and a sealing material is applied to the assembly to thereby prepare a cell having a spatial gap.

The color filter used in this embodiment is a photosensitive resin type pigment dispersed color filter which is obtained by dispersing pigment in a photoresist followed by patterning.

A mixture of liquid crystal, monomer, oligomer and so on is injected into the cell, and ultraviolet rays are irradiated to the cell to cure the monomer, oligomer to form resin, whereby LCSM is obtained. In particular, a product obtained by using polymer is referred to as a liquid crystal polymer composite (LC/PC).

Thus, a transparent-scattering type liquid crystal display element is preferably formed wherein the LC/PC layer in the liquid crystal display element has such a structure that nematic liquid crystal having a positive dielectric anisotropy is dispersed and held in the resin.

The display portion of the liquid crystal display element has a diagonal line of 11.94 cm (4.7 inches), a pixel size of 50 μm (×RGB)×150 μm, and comprises 640 pixels (×RGB) in lateral direction×480 pixels in longitudinal direction wherein the aperture rate of each pixel is 40% and the maximum transmittance is 33%.

The light source optical system comprises the light source 11 (including a metal halide lamp of an arc length of 4 mm and 150 W) the ellipsoidal mirror 12 (first focal distance of $f_1$=22 mm, second focal distance of $f_2$=105 mm, the total depth H=50 mm) and the convex type cone-like prism 3 (apex angle of $\alpha_1$=140°, diameter of bottom surface in cross section: 50 mm, height: 18 mm wherein height of the inclined surface of the cone-like prism is 16.5 mm). As the condenser lenses, the first condenser lens 131 (a flat convex lens of focal distance of 200 mm) and the second condenser 132 (a flat convex lens of focal distance of 200 mm) are used. Further, the first aperture 17 with an iris diaphragm of numerical aperture changeable type is provided at a position near the second focal point of the ellipsoidal mirror 12 and between the cone-like prism 3 and the condenser lens 131.

Of the light passing through the liquid crystal display element 15, only the light passing through the second aperture 18 forms an image as a liquid crystal display image on a screen through the projection lens 19. Similarly, the second aperture 18 with an iris diaphragm of numerical aperture changeable type is disposed at the position of the pupil of the projection lens where the conjugated image of the numerical aperture of the first aperture 17 is formed by the second condenser lens 132.

In the next, description will be made as to a construction to improve the directivity and the color purity of light for each color of R, G and B in this embodiment.

Figure 6:
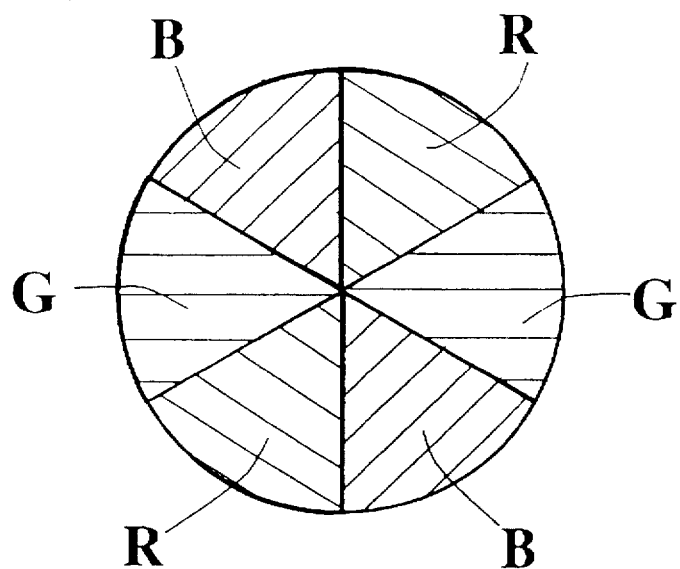
FIG. 6 is a plane of a filter as the first example of the present invention.
Figure 7:
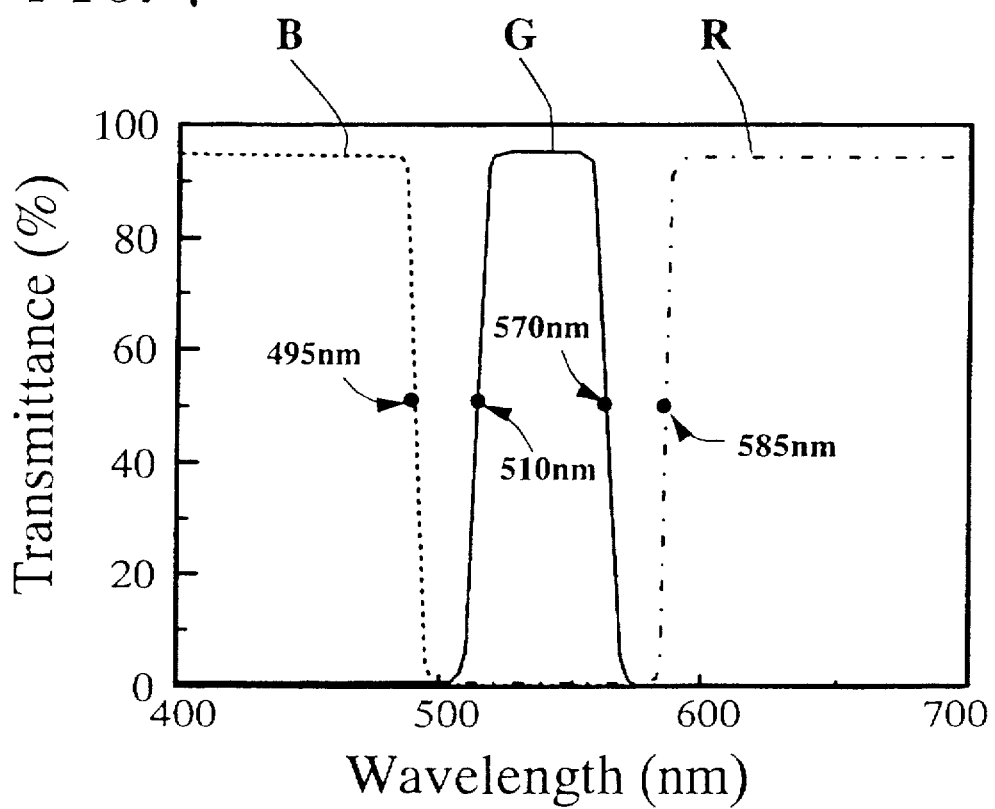
FIG. 7 is a graph showing the spectral transmittance characteristic of the filter in the first example.

The first filter 1 and the second filter 2 each having radially extending areas for defining the wavelength band of each color of R, G and B, which are arranged symmetrically with respect to the optical axis as shown in FIG. 6, are arranged respectively near the opening of the first aperture 17 and the opening of the second aperture 18. The first and the second filters 1, 2 are respectively optical interference filters which are formed by alternately multi-layered dielectric films of high refractive index and dielectric films of low refractive index each having the film thickness of the order of visible light wavelength. FIG. 7 shows the spectral transmittance of the optical interference filter. The filters actually used are shown in FIG. 6 wherein the surface area of light path is divided into some portions for the spectrum of three colors R, G and B. In these filters, the aperture diameter in average is determined from the above-mentioned formulas 1 and 2 depending on occupied surface areas $K_R$, $K_G$, $K_B$ which correspond to respective colors R, G and B. Further, the dispersing angles $\Phi_R$, $\Phi_G$, $\Phi_B$ and the collection angles $\delta_R$, $\delta_G$, $\delta_B$ are determined in correspondence to respective colors R, G and B according to the formulas 3 and 4. Here, $\delta=\phi$ for R, G and B, and $L_1=L_2=200$ mm because the focal distance between the first condenser lens 131 and the second condenser lens 132 is 200 mm. Accordingly, when $\delta_R=\delta_G=\delta_B=6°$ with respect to the colors R, G and B, the occupied surface areas are $K_R=K_G=K_B=3.47$ cm².

In FIG. 6, R, G and B respectively have two portions, and there are 6 portions in total.

The iris diaphragm which can change the surface area S of the opening by increasing or decreasing the outer circumference while the circular shape of the opening portion is maintained, is used for each of the first aperture 17 and the second aperture 18. With use of the iris diaphragm which actually determines the aperture diameter in average, the total surface area of the opening is determined to be $S=K_R+K_G+K_B=10.41$ cm², namely, the diameter of the opening of the aperture 1 is 36.4 mm. In this case, a contrast ratio of 100:1 or more can be obtained.

Figure 8:
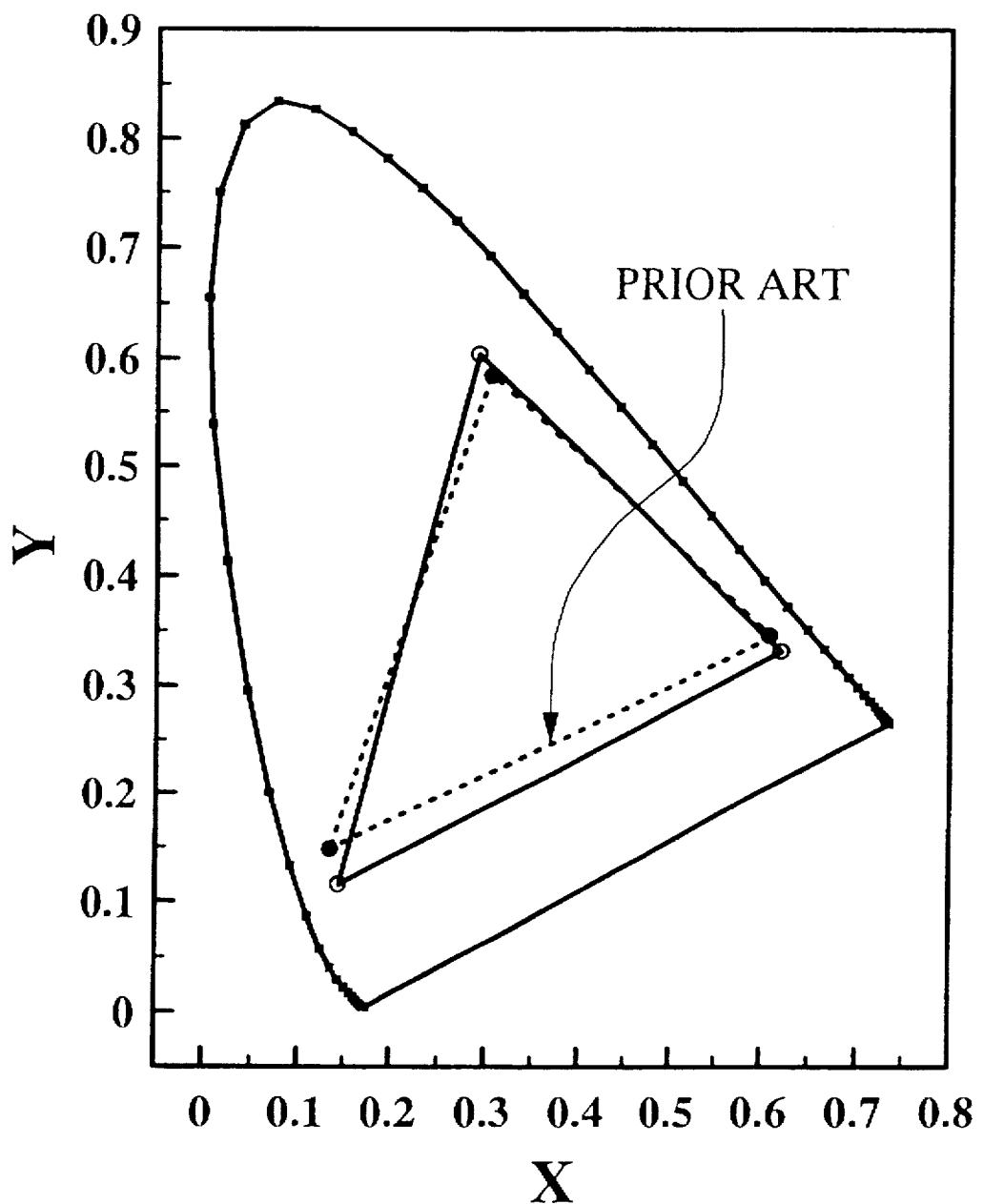
FIG. 8 is a graph showing the color gamut of projected images in the first embodiment and a conventional technique.

The chromatic coordinate of a projected image in this embodiment is shown by a solid line in FIG. 8. A dotted line represents the chromatic coordinate in a case of a conventional apparatus without using the filters 1 and 2. In comparing the chromatic coordinates, it is understood that the color purity of RGB is improved and the color gamut is expanded. Table 1 shows results of the comparison of the contrast ratio and the color purity (color gamut) of projected images depending on the presence or absence of the filters 1 and 2 in the Examples and Comparative Examples.

TABLE 1

|  | Filter 1 | Filter 2 | Contrast ratio | Color gamut |
|---|---|---|---|---|
| Embodiment 1 | Yes | Yes | 110 | ◎ |
| Comparative Embodiment 1 | Yes | No | 35 | ○ |
| Comparative Embodiment 2 | No | Yes | 35 | ○ |
| Comparative Embodiment 3 | No | No | 30 | △ |

(Remark) ◎: Wide, ○: Normal, △: Narrow

When the color-divided structure as shown in FIG. 6 is used for the first and second filters 1, 2, the proportion of surface areas in the wavelength regions of R, G and B does not change and is substantially constant even when the apertures diameter are changed by operating the iris diaphragm. Since the light source generally has a finite luminescent area, the projected image is bright when the opening portion of the first and second apertures are increased. Accordingly, the brightness and the contrast ratio of the projected image can be simultaneously adjusted by changing the diameter of apertures with the iris diaphragm depending on the brightness in circumstances in which the projected image is displayed. Thus, by determining the aperture values in order to obtain the optimum contrast ratio in certain circumstances of brightness, a display easy to see and free from a change of color balance is obtained.

FIG. 6 shows an example of the filters wherein there are 6-divided portions for R, G and B each having the same surface area $K_R=K_G=K_B$. However, the portions for R, G, B may have different surface areas, or another number of divided portions may be utilized. When the number of divided portions is many, a distribution of light quantity in the entire picture surface can further be uniform. On the other hand, even when the number of divided portions is smaller, a sufficient projected image can effectively be obtained due to diffusing function of light in the light path in a Schlieren. optical system. Practically, a divided number of 6–18, preferably, 12–18 is utilized.

Since high heat-resisting characteristics and high light-resisting characteristics are required for the filters used for such purposes, it is preferable to use optical interference filters made of dielectric multi-layered films as transparent-reflection type dichroic filters rather than light absorbing type filters. These filters are superior to the light absorbing type filters in terms of the color separating characteristics and the transmittance, and accordingly, they are used as spectral filters having high color purity.

The interference filter of dielectric multi-layered films are formed by alternately depositing dielectric films having different refractive indices on a substrate by a vacuum evaporation method or a sputtering method. When a patterning operation is conducted to obtain the filter having RGB regions as shown in FIG. 6, a conventional technique such as a mask vapor deposition method, a lift-off method wherein a copper film as an undercoat is used for a resist, may be used.

For the filters used, it is not always necessary to use filters having radially divided portions which are symmetric with respect to the optical axis, but they may have such structure that a plurality of spectral elements having different spectral characteristics are arranged in a stripe form, a lattice form or a spot (circular) form. In any case, it is sufficient that the filters for three colors RGB are arranged to have a relation forming a conjugated image between the filter 1 and the filter 2.

The shape of the opening of the filter is not always a circular shape but it may be a rectangular shape.

The filter of the present invention may be a glass substrate on which an interference filter comprising a dielectric multi-layered film is formed, the glass substrate being disposed in the light path. Or the filter may be formed on the surface (a cone surface or a flat surface) at the light emission side of the cone-like prism 3 in the light source optical system.

In order to maintain a high directivity of light and a uniform distribution of light from the light source, it is preferable to use a cone material (a cone-like prism or a cone-like reflector). However, a lens, a lens array or a diffusion plate may be used instead of the cone material so as to improve uniformity of projection light. In a case of using the cone material, the optical system should be adjusted so as to obtain light having the dispersing angle ø and the collection and δ in a range of 2°–14°, preferably 5°–10° wherein ø=δ. In this case, high efficiency of utilization of light from the light source, high directivity of light and a uniform distribution of projection light are satisfactorily obtained.

Figure 9:
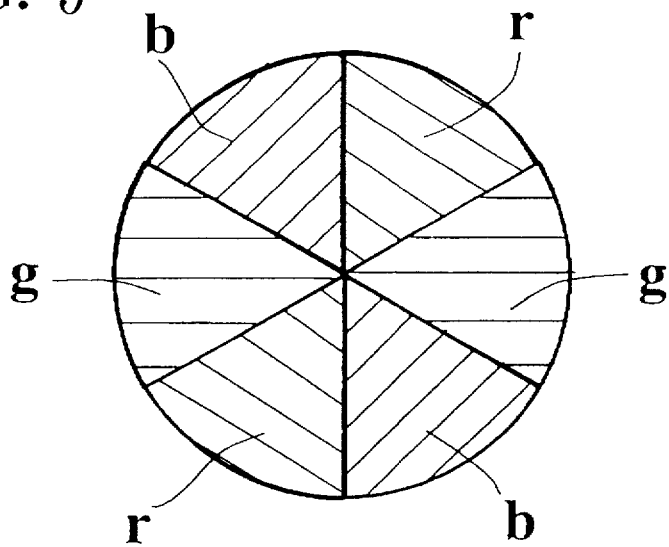
FIG. 9 is a plane view of a filter as the second example of the present invention.

The first embodiment concerns a structure that light passing through the filters disposed in the light path is utilized. Instead of this, a reflection type color-separating filter (dichroic mirror) can be used. For instance, a dichroic mirror having portions each reflecting each color R, G or B as shown in FIG. 9 may be used. FIG. 10 shows the spectrum reflectance of the dichroic mirror. Use of the reflection type dichroic mirror reduces loss of light and further improves efficiency of utilization of light in the system as a whole.

Figure 11:
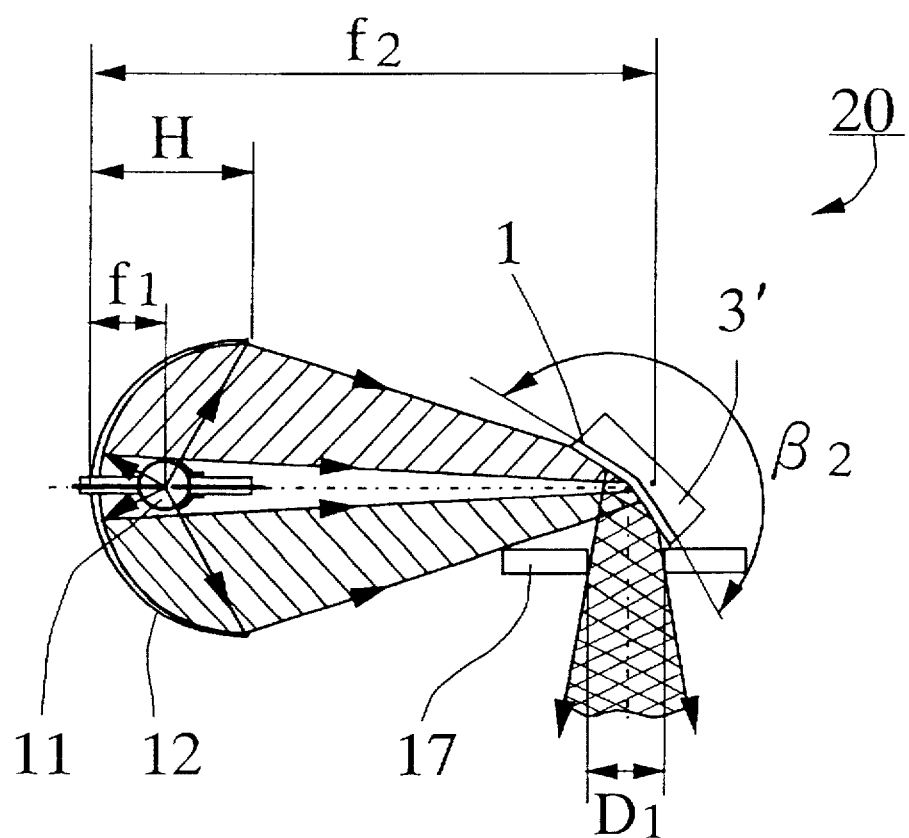
FIG. 11 is a diagram showing a light source optical system using the filter of the second example of the present invention.

When the reflection type dichroic mirror is used, a cone-like reflector (the apex angle of a concave portion is $β_2=1950°$, the diameter of bottom surface in cross section is 50 mm, and the height is 12 mm wherein the depth of the inclined surface of the cone-like reflector 3' is 3.3 mm) as shown in FIG. 11 is used instead of the cone-like prism. The dichroic mirror is formed on the inclined surface (the cone surface).

Even in a case of using the reflection type color separating filter (dichroic mirror), a dichroic mirror may be formed on a surface or a cone-like reflector, a lens, a lens array or a surface of a diffusing plate. In this embodiment, a projected image having improved color purity can be effectively obtained and further, the projected image having a high contrast ratio, a sufficient brightness and high uniformity can be achieved even when a transparent-scattering type liquid crystal display element with a color filter for each pixel is used.

Supposing that the same filters having the same surface area of opening are used, there is a loss of about ⅓ of light from the light source at the filters in this embodiment in comparison with the conventional apparatus without using the filters. However, in this embodiment using the filters, the aperture diameter is increased to increase the light quantity. Further, a high directivity can be maintained for the lights having wavelength regions corresponding to the divided portions of RGB. Further, the projection lens 19 may be constituted by a plurality of lenses, and the second filter 2 may be installed in the projection lens.

(EMBODIMENT 2)

A projection type color display apparatus is formed according to Embodiment 1 except that a monochrome liquid crystal display element 15 wherein a RGB mosaic-like color filter is not formed for each pixel is used, and a first filter 1 and a second filter 2 each having such characteristic that the occupied surface area to the aperture is smaller as the wavelength region becomes higher, are used.

The display size of the liquid crystal display element 15 is 7.87 cm (3.1 inches) in diagonal and a size of each pixel of 100 μm×100 μm, and it comprises 640 pixels in lateral direction×480 pixels in longitudinal direction wherein the aperture rate of pixel is 40% and the maximum transmittance is 33%.

In the following, description will be made how the directivity of light in this embodiment is changed depending on wavelengths.

The first filter 1 and the second filter 2 each having as a structural element the RGB filter of the same spectral characteristic as that of Embodiment 1 are respectively disposed near the opening of the first aperture 17 and the opening of the second aperture 18 so that the occupied surface area to the aperture is reduced as the spectrum region shifts to a higher region.

Specifically, the filters having divided surface areas of light path for the spectrum of three colors R, G and B are used. The apertures of filters are determined depending on the occupied surface areas depending on the wavelength regions of the colors by using formulas 1 and 2. Further, the dispersing angle ø and collection angle δ are also determined by the formulas 3 and 4. When δ=ø, $L_1=L_2=150$ mm because the focal distance between the first condenser lens 131 and the second condenser lens 132 is 150 mm. Accordingly, when δ=6° for R, the occupied surface area is $K_R=1.95$ cm$^2$.

The relationship of the directivity to the characteristics of the liquid crystal display element is described. When a transparent-scattering type liquid crystal display element with an LCSM layer which has the wavelength dependence and the collection angle dependence to contrast ratio as shown in FIG. 25 is used, the collection angle δ for G and B should respectively be 6.6° (G) and 7.4° (B) in order to obtain the same contrast ratio as R.

Accordingly, the occupied surface areas for G and B in the first and second filters 1, 2 are respectively $K_G=2.36$ cm$^2$ and $K_B=2.98$ cm$^2$. Namely, the filters should be divided for R, G and B so that the proportion of the occupied surface areas for R, G and B satisfies $K_R:K_G:K_B=1:1.21:1.53$.

In FIG. 6, R, G and B respectively have two divided portions, and there are 6 divided portions in total.

The iris diaphragms which can change the surface area of the opening by increasing or decreasing the outer periphery of the opening while the circular shape of the opening portion is substantially maintained, are used for the first aperture 17 and the second aperture 18. With such iris diaphragms for determining actually the opening diameter, the surface area of opening as a whole can be provided to be $S=K_R+K_G+K_B=7.29$ cm$^2$, namely, the diameter of opening can be 30.5 mm. In this case, the wavelength dependence of the projected image can be reduced, and a contrast ratio of 100:1 or more can be obtained over the entire region of visible light.

When the color-divided area of the first and second filters 1, 2 are determined as shown in FIG. 6, the proportion of the surface areas for the wavelength regions does not change and is substantially constant even when the aperture diameters $D_1$, $D_2$ are changed with the operation of the iris diaphragms. Accordingly, the brightness and the contrast ratio of a projected image can be simultaneously adjusted by changing the aperture diameters $D_1$, $D_2$ with the iris diaphragms depending on brightness in circumstances in which the projected image is formed. When the numerical aperture value is determined to obtain the optimum contrast ratio in circumstances having a certain degree of brightness, a display easy to see and having a constant color balance can be obtained.

Generally, when a light source which is not a spot light source is used, it is difficult to obtain efficiently light having a high directivity from the light source optical system, and efficiency of utilization of light decreases as the dispersing angle ø is smaller. Accordingly, in such a case that the directivity of R, G or B is different depending on wavelength regions, and the converging angle δ=ø becomes smaller as the spectrum range moves to a higher region, the proportion of the light fluxes of projection light exhibits such a tendency that an amount of light in a long wavelength region is relatively small in the spectral distribution of light emitted from the light source. Accordingly, the spectrum of light from a lamp used as the light source for projection should contain a relatively large amount of R component, i.e. a low color temperature is preferable. Specifically, a lamp having the emission spectrum of a color temperature of 3000K–7000K is effective. In particular, when a halogen lamp for emitting light of low color temperature is used for the light source for projection, the color temperature of light of the secondary light source and light of the projected image should be increased to provide a white color near natural color.

In FIG. 6, a transparent type interference filter for three colors R·G·B is used so as to satisfy the following formula:

$$K_R < K_G < K_B \quad \text{(Formula 11)}$$

where $K_R$, $K_G$ and $K_B$ represent occupied surface areas for three colors: R (red), G (green), B (blue).

Figure 20:
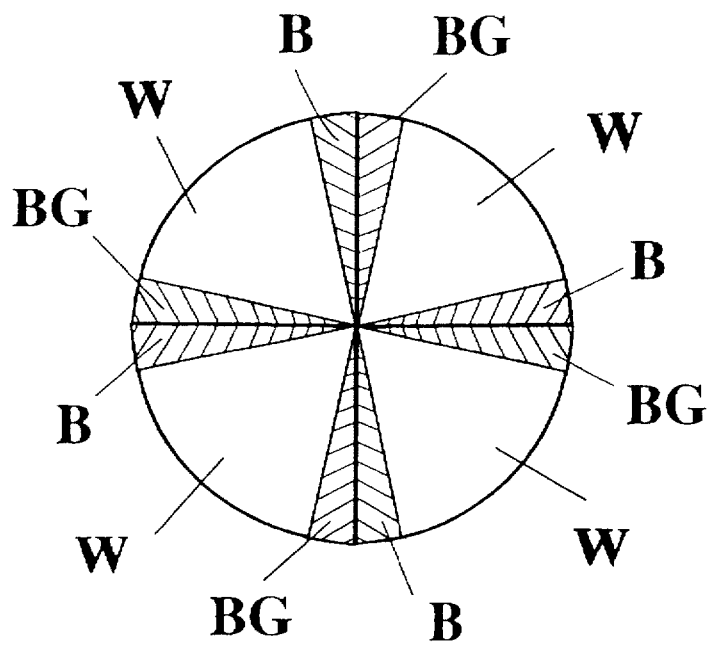
FIG. 20 is a plane view of a filter as the third example of the present invention.

FIG. 20 shows another embodiment of the filter. The filter has radially extending divided portions in a part of the opening portion wherein there are interference filter portions which reflect only R and allow to transmittance of B and G, interference filter portions which reflect only R and G and allow to transmittance of B, and the remaining portions (W) which allow all the wavelength regions to pass through. The filter may satisfy the relation of formula 11. FIG. 21 shows the spectral transmittance of the filter.

Figure 22:
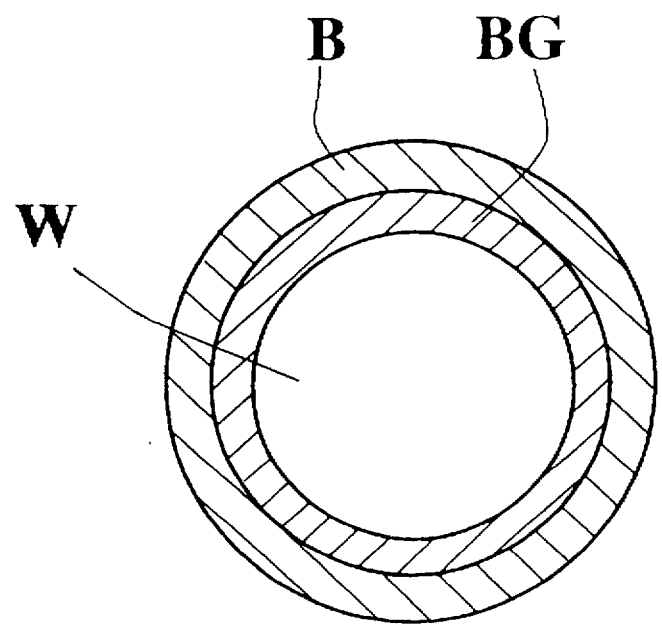
FIG. 22 is a plane view of a filter as the fourth example of the present invention.

The filter used need not always have the radially extending divided portions which are symmetric with respect to the optical axis, but may have a stripe shape, a lattice shape (a zig-zag shape or a mosaic shape), a spot-like shape (a circular shape) or a doughnut-like shape having a complete opening portion at its central portion as shown in FIG. 22. In either case, the occupied surface areas $K_R$, $K_G$ and $K_B$ which respectively correspond to three colors RGB should satisfy the relation of formula 11. Further, the shape of the opening is not always necessary to have a circular shape but it may be a rectangular shape.

In a case that a metal halide lamp for emitting light of a color temperature of 4500K is used as the light source, the contrast ratio of light of each color R, G, B and synthesized white color light, and the light fluxes of projection light were estimated. Embodiments 2a and 2b respectively correspond to the case that the collection angle of B or R is 6° and the first filter and the second filter respectively have such structure that the contrast ratio of R, G and B is the same. In Comparative Embodiment 4, simple color correcting filters are used for the first and second filters so that the color temperature of the projected image is the same.

TABLE 2

|  | Contrast ratio | | | | Projected light flux (relative value) |
| --- | --- | --- | --- | --- | --- |
|  | B | G | R | W | |
| Embodiment 2a | 150 | 150 | 150 | 150 | 80 |
| Embodiment 2b | 100 | 100 | 100 | 100 | 120 |
| Comparative Embodiment 4 | 150 | 120 | 100 | 120 | 80 |

(EMBODIMENT 3)

In Embodiment 2, three transparent-scattering type liquid crystal display elements (they are made in accordance with the same standard and have substantially the same characteristics) provided with LC/PC having the same specification are used, instead of the single transparent-scattering type display element for colors R, G and B.

Light emitted from the light source optical system is color-splitted into three colors B, G and R by means of two kinds of dichroic mirrors which are used as color separation and synthesizing systems. The splitted color lights are respectively incident into three first condenser lenses to be formed into substantially parallel lights, and are incident into three liquid crystal display elements for R, G and B. Each non-scattered light passing through the display elements is converged, by means of three second condenser lenses, to a position where a single projection lens is located, and converged light is projected to a screen. However, scattered light is removed by a second aperture and is not projected onto the screen. The other structural elements are the same as those of Embodiment 2.

Thus, when filters are combined with the system structure including three transparent-scattering type display elements having the same structure, a projection type color display apparatus wherein the brightness of projected image can be improved in comparison with the conventional apparatus and the density of the picture elements is high in comparison with the panel of a single display element with mosaic color filter, can be obtained.

Further, by using the transparent-scattering type display elements having the same structure, difference in the contrast ratio due to the difference of colors RGB is minimized, and accordingly, it is unnecessary to prepare display elements of different specification for different wavelength regions. Accordingly, a large scale production is possible and the system of this embodiment is advantageous in terms of cost.

In this embodiment, it is preferable to dispose the dichroic mirrors with such arrangement that an incident angle of light is about 30°, whereby efficiency of utilization of light can be improved without reducing the color purity.

Further, when a filter having the spectral characteristics as shown in FIG. 7 or FIG. 10 is used for at least the first filter, the color purity of light from the light source in wavelength regions of R, G and B is controlled. Accordingly, requirements of accuracy of the color separating and synthesizing function of the dichroic mirrors in the color separating and synthesizing optical system can be released. In particular, an yellow light in a wavelength region of 570–590 nm which causes deterioration of the color purity of G and R is removed by the first filter, whereby the color purity of G and R can be improved.

(EMBODIMENT 4)

A reflection type liquid crystal display device is formed by forming a light reflecting layer at the side opposite the light incident side of the transparent-scattering type liquid crystal display element in Embodiment 1 or Embodiment 2. Specifically, such structure that light enters from the counter electrode side by using, as a reflecting electrode, an ITO transparent electrode formed for each pixel, is used. The reflecting electrode may be made of a metallic film such as aluminum, silver or the like, or may be a multi-layered mirror made of a dielectric material which is formed by alternately depositing light-transmitting dielectric films having different refractive indices and by changing the reflective indices (large refractive index/small refractive index), the films having the thickness in the order of wavelength of light.

Figure 12:
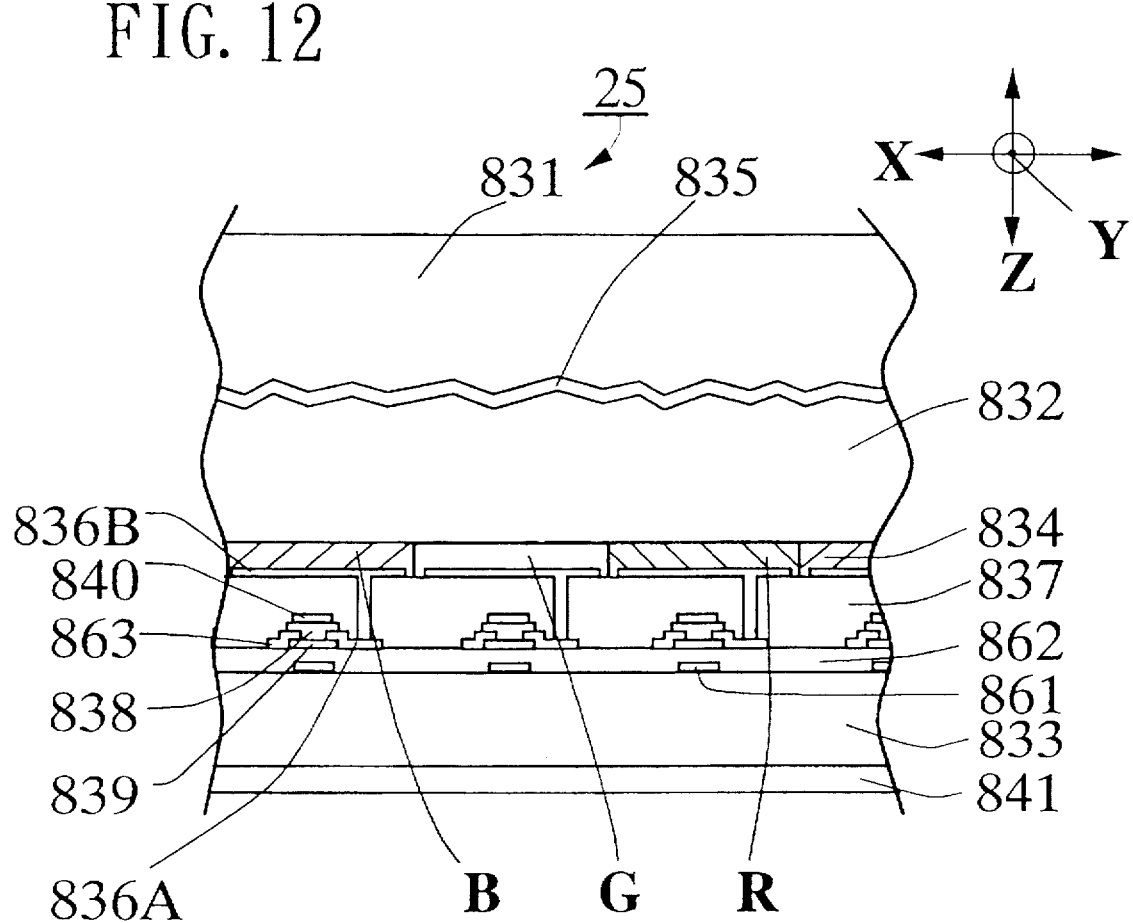
FIG. 12 is a diagram in cross-section of a reflection type display element according to the second embodiment of the present invention.

FIG. 12 shows a structure in cross-section of the reflection type liquid crystal display element of this embodiment. The detail of the structure is described below.

On the entire display surface of an active matrix substrate 833 comprising a glass substrate on which a TFT array and bus lines for electrodes (gate electrodes 861 and signal electrodes 863), $TiO_2$ films having a refractive index of 2.3 and $SiO_2$ films having a refractive index of 1.45 wherein each optical film thickness (refractive index×film thickness) is about 100–200 nm and are alternately deposited to be about 20 layers to thereby prepare a dielectric multi-layered mirror 837.

A contact hole is formed at a position of the dielectric multi-layered mirror to connect a drain electrode 836A for each TFT. A transparent electrode of ITO 836B is formed on the multi-layered mirror to connect to the drain electrode 836A. Patterning is conducted so that the transparent electrode acts as a pixel electrode to each TFT array. In this case, it is prefer to use such a structure that the TFTs and the major portion of the bus lines are covered by pixel electrodes.

Figure 13:
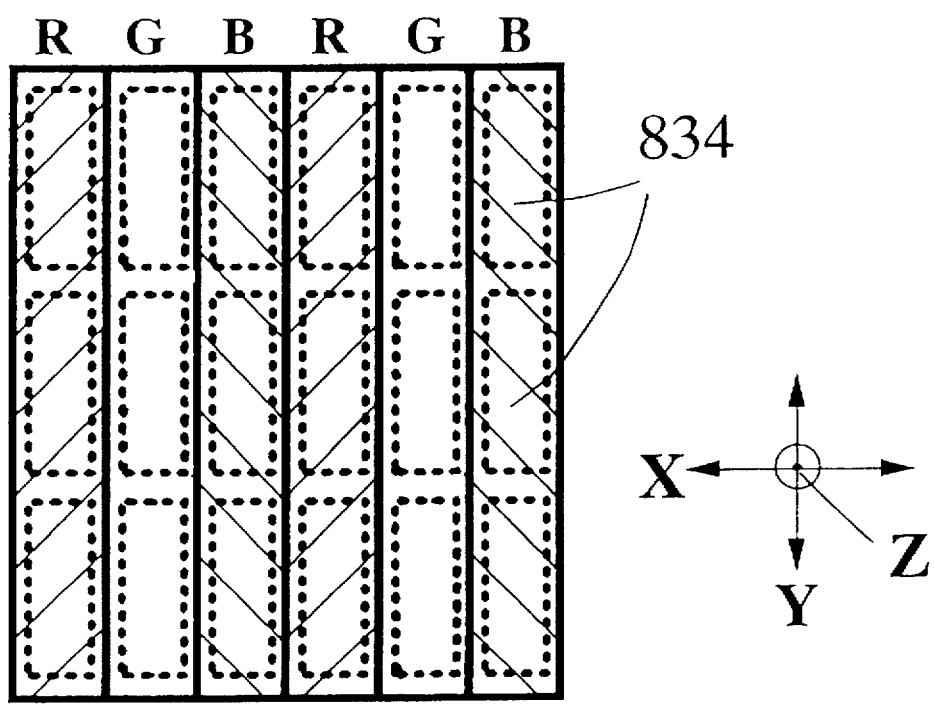
FIG. 13 is a diagram in plane view of the reflection type display element according to the second embodiment of the present invention.

Further, as shown in a plane view of FIG. 13, pigment dispersing color filters for R, G and B 834 are so arranged as to be in a linear line form along a Y axis of the optical system in FIG. 14 (which is described hereinbelow) and to cover each of the pixel electrodes and gaps between adjacent pixel electrodes. In this case, the film thickness of the color filters can be half (about 1 μm) in comparison with the case of the transparent type display element.

When light passes through the multi-layered mirror 837 to reach a semiconductor layer 839 of the TFT and the light is absorbed, a light-induced current is generated, which deteriorates the quality of the display element. In order to reduce such leak current, a light shielding layer 840 is formed on an insulating layer 838. Further, a black color layer 841 is formed on the back surface of glass substrate in order to block incident light or reflection light at the back surface of glass of the active matrix substrate 833.

In FIG. 12, a minute convex and concave portion is formed on the front surface of glass, and a transparent electrode ITO 835 is formed on the minute convex and concave portion to prepare a counter substrate 831. The counter substrate has no light shielding layer (black matrix).

LC/PC 832 which functions as a electro-optical layer is located between a transparent electrode ITO 835 and color filters (R,G,B) 834.

A projection type display apparatus 30 as shown in FIGS. 14 and 15 is prepared by using such reflection type liquid crystal display element 25. When incident light is made incident to the reflecting layer of the reflection type liquid crystal display element 25 with an inclination angle of about γ=2°–10° (look-up angle), the light emitted from the light source optical system advances along an optical axis AX and converged to the reflection type liquid crystal display element 25 by means of a condenser lens 13. The incident light (with an incident angle of γ) is specularly reflected at the reflecting layer of the liquid crystal display element 25 and passes again through the condenser lens 13 whereby the conjugated image of a first aperture 17 of the light source optical system is formed at a position which does not overlap with the first aperture 17. A second aperture 18 is disposed at the position where the conjugated image is formed.

Filters disposed in the vicinity of the first and second apertures 17, 18 may be the same as those used in Embodiment 1 or Embodiment 2, or may be of a different type. Further, in order to eliminate the overlapping of light reflected at an interface with the projected image, an anti-reflection film or a minute uneven surface is formed on or in a surface of an ITO electrode of the counter substrate. Further, it is preferable to reduce reflection at the interface by bonding the condenser lens 13 to the counter substrate 831.

When the transparent-scattering type liquid crystal display element 25 is used to form a reflection type display element, light reciprocates in the LCSM layer whereby the scattering power is remarkably improved in comparison with the transparent type display element. As a result, the contrast ratio of a projected image is improved when the collection angle of light is the same. Further, when the collection angle is determined to have a large value so that the contrast ratio is the same, a further bright projected image can be obtained.

In this embodiment, description has been made as to a case that the color filter is formed on the active matrix substrate. However, it may be formed on the counter substrate as in the conventional technique. In this case, however, it is preferable that an overcoat layer is formed on the color filter formed on the glass substrate; a minute uneven surface is formed in the front surface of the overcoat layer with a technique such as a transfer printing method, and then, a transparent electrode is formed on the minute uneven surface whereby light reflected at the interface which causes an overlapped projected image and the deterioration of the contrast ratio can be reduced.

The mirror of dielectric multi-layered films may be formed by depositing a plurality of dielectric films of high refractive index and dielectric films of low index alternately, the films being made of $Ta_2O_5/SiO_2$ or $Si/SiO_2$ other than a combination of $TiO_2/SiO_2$. When a combination of the dielectric films wherein the difference of the refractive indices is large, a high reflectance and a wide reflection wavelength band region can be easily obtained. Further, the resistance of the dielectric material used should be $10^{10} \Omega/cm^2$.

In this embodiment, the construction that the light absorbing type color filter is formed on the reflection electrode substrate as shown in FIG. 12 is used. However, a dichroic mirror having RGB reflection-spectral characteristics wherein a reflection electrode for each pixel corresponds to electric signals for each image of R, G and B may be used instead of the above-mentioned structure. In this case, a reflection type color filter for reflecting only R, G and B is formed by changing the film thickness of the mirror made of dielectric multi-layered films 837 for the pixel elements R, G and B. Specifically, film-forming and etching operations are conducted separately for the mirror made of dielectric multi-layered films for R, G and B.

With the above-mentioned construction, a color filter of high reflectance and high color purity can be obtained in comparison with the light-absorbing-pigment dispersing type color filter. Since the color filter having such construction is free from heat generation due to light absorption, there are less restrictions on requirements of heat resistance even when incident light of high illuminance is used.

(EMBODIMENT 5)

Description will be made as to an embodiment of projection type color display apparatus having the optical system as shown in FIGS. 14 and 15 except that three transparent-scattering type liquid crystal display elements are used as a reflection type for respective colors of R, G and B instead of the transparent-scattering type liquid crystal display element having a structure of single reflection type wherein the three liquid crystal display elements having no color filters of R, G and B for a pixel.

In this embodiment, a color separating and synthesizing system having two kinds of dichroic mirror surface is disposed in the light path between the light source optical system and the reflection type liquid crystal display elements. Light emitted from the light source optical system is color-separated into three colors of R, G and B by means of the two kinds of dichroic mirror surface. Then, non-scattered lights, which are reflected in the liquid crystal display elements and are passed therethrough, are received in the projection lens 19 to be projected on a screen (not shown). However, scattered lights are removed by the second aperture 18 and the second filter 2 and are not projected on the screen.

The dichroic mirror used in this embodiment is preferably disposed so that the incident angle of lights is 45° or lower, preferably in a range of 25°–40°. The two kinds of dichroic mirror surface may be formed on two glass plates separately arranged, or may be formed on flat surfaces of prisms divided into three or four portions, the mirror surfaces being bonded to the flat surfaces with an optical adhesive.

With use of the three transparent-scattering type display elements having the same structure, the brightness of a projected image is increased and an accurate arrangement of the display element can be maintained in comparison with a case of using a single transparent-scattering type display element.

(EMBODIMENT 6)

In embodiment 6, a cell is prepared by using two substrates instead of using the active matrix substrate. On the entire surface of each of the substrates, an ITO transparent electrode is formed. Thus, three transparent-scattering type shutters are prepared. Further, a bundle of optical fibers, which are used instead of the projection lens, are disposed just behind the second filter 2 to use them as an illuminating apparatus. In this case, a high speed color light regulating apparatus wherein a change of color temperature is small can be obtained.

(EMBODIMENT 7)

An embodiment of a projection type color liquid crystal display device comprising a light source system emitting three colors R, G and B, a single reflection type liquid crystal display element and a projection optical system will be described.

Figure 27:
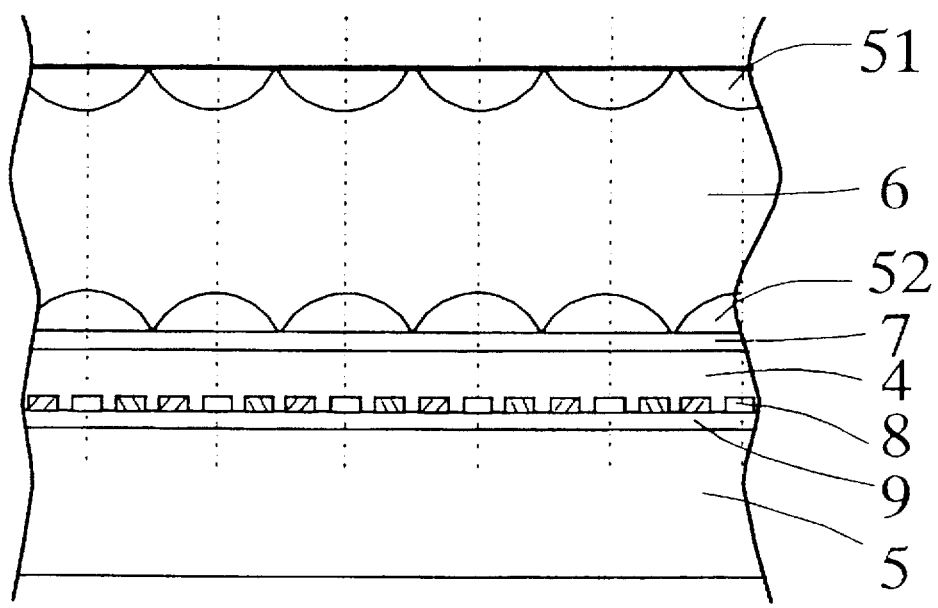
FIG. 27 is a diagram in cross-sectional view of the reflection type display element according to the third embodiment of the present invention.

For the reflection type liquid crystal display element in this embodiment, the reflection type liquid crystal display element suitable for displaying a colored image as shown in FIGS. 26 and 27 is used.

Figure 34:
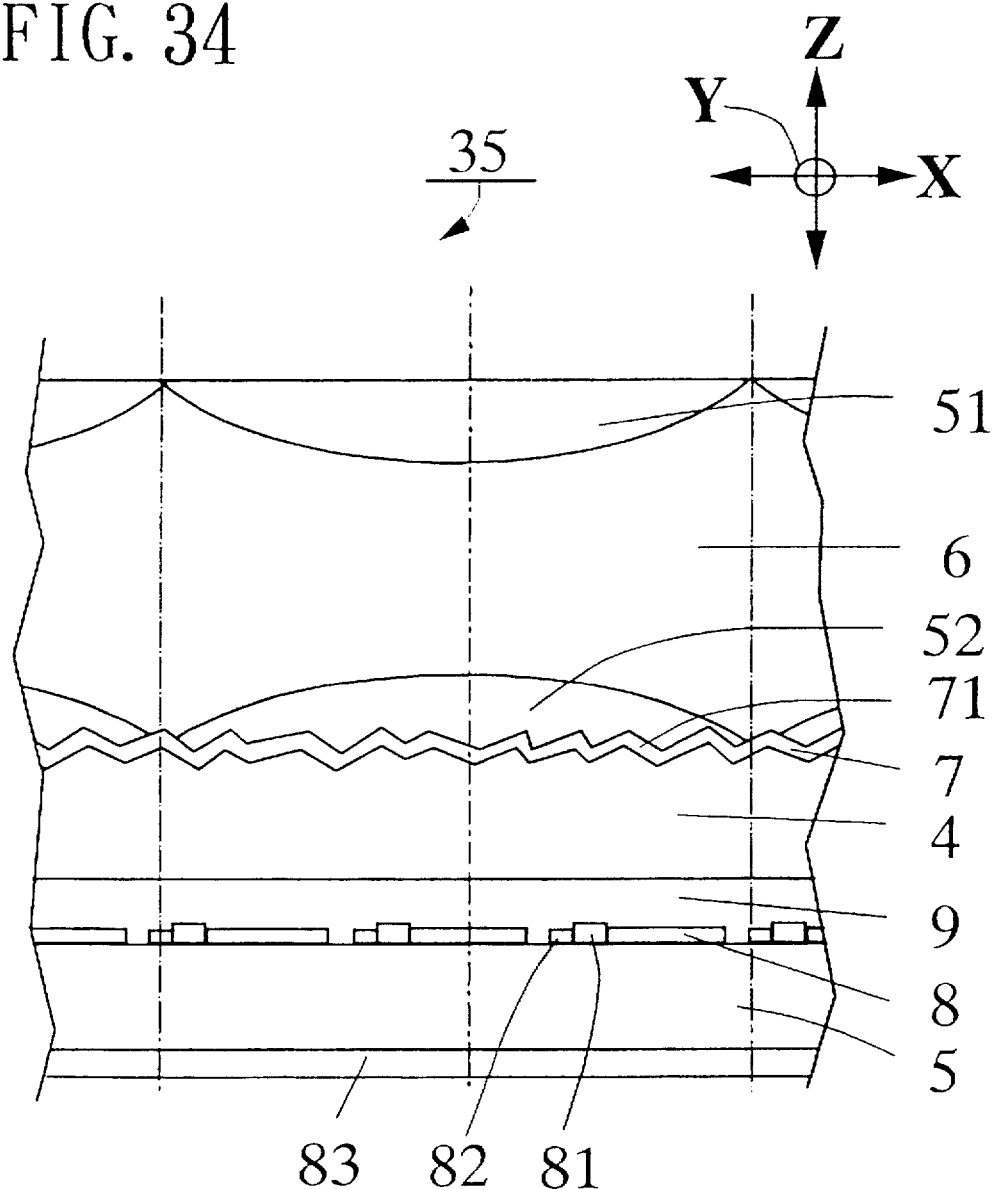
FIG. 34 is a diagram in cross-sectional view of the reflection type display element according to the third embodiment of the present invention.
Figure 35:
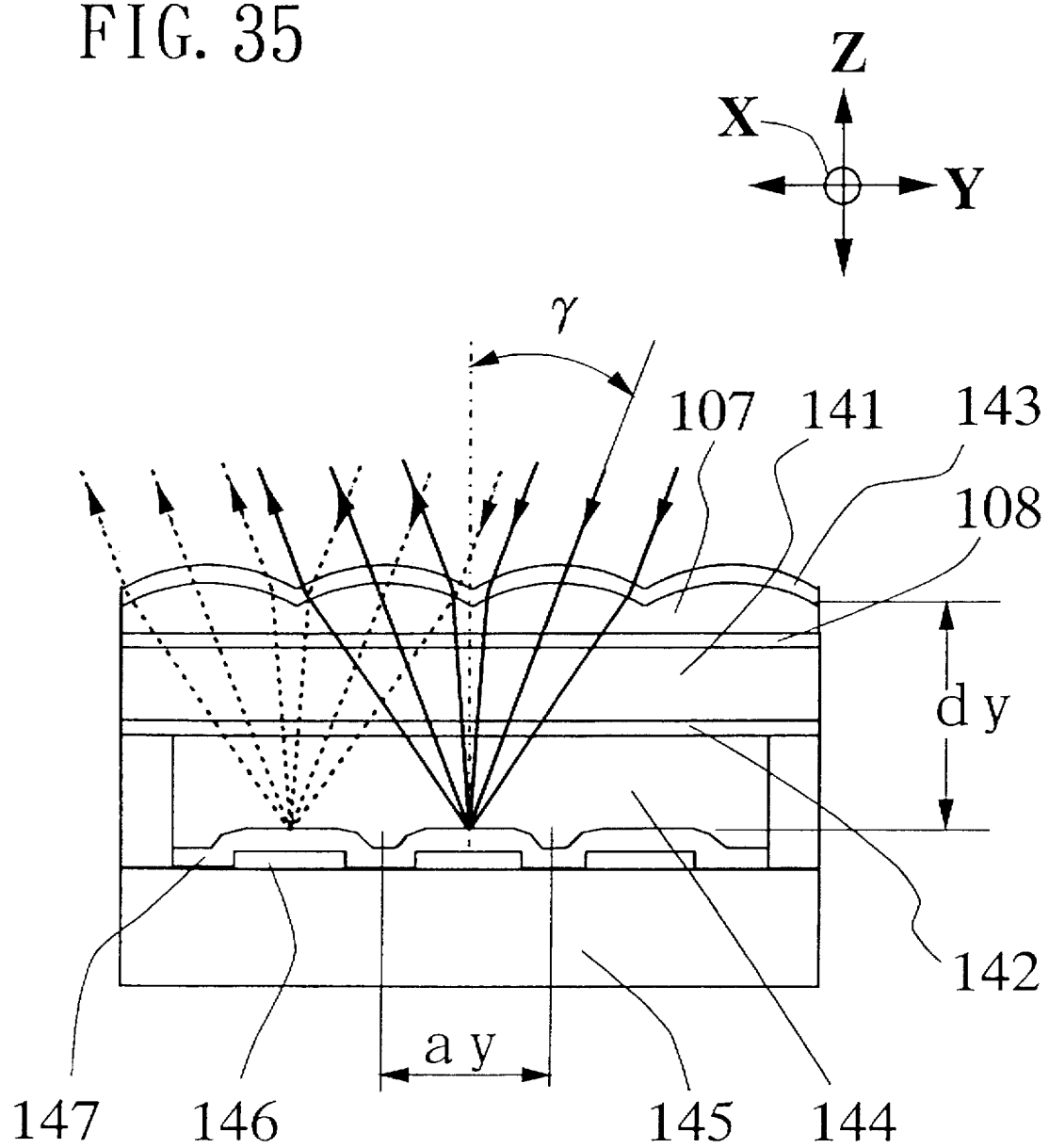
FIG. 35 is a diagram of a projection type liquid crystal display device with a microlens as a conventional technique.

A part of the liquid crystal display element is shown in a cross-sectional view of FIG. 34. In this embodiment, a light-transmitting counter substrate 6 is used wherein an active matrix driving substrate 5 on which TFTs are formed for transparent electrodes 8 of ITO for forming pixels and transparent electrodes 7 are formed on the entire display surface of the counter substrate. A sealing material is coated on the counter substrate 6 to thereby prepare a cell having a space gap. And an electro-optical functioning layer 4 such as LC/PC is located between a transparent electrode 8 and a transparent electrode 7.

The active matrix driving substrate 5 is an active matrix substrate formed by forming a TFT array 81 and an electrode bus line 82 (including gate electrodes and/or signal electrodes) on the glass substrate (shown in FIG. 34). In this embodiment, in order to form a reflection type substrate, $TiO_2$ films having a refractive index of 2.3 and $SiO_2$ films having a refractive index of 1.45 which are electrically insulating materials and have an optical film thickness (refractive index×film thickness) of about 100–200 nm are alternately deposited to have about 20 layers on the entire display surface of the active matrix substrate having transparent type pixel electrodes thereby prepare a mirror of dielectric multi-layered films, which is used as a reflecting layer 9. The reflecting layer 9 has a reflectance of 90% or more to light of visible wavelength region.

When the reflecting layer 9 is used, an island-like light shielding film (black matrix: BM) should be formed on TFTs at the light incident side by interposing the reflecting layer 9 formed of the mirror of dielectric multi-layered films so as not to change the transistor characteristic with respect to incident light of high luminance. Further, a light shielding layer 83 is formed by coating a black paint on the back surface of the glass substrate in order to block incident light to the active matrix substrate 5 or reflecting light from the back surface of the glass of the active matrix substrate 5.

Microlens arrays 51 and 52 are formed as the first light converging means 1 and the second light converging means 2 respectively on both sides of the light transmitting counter substrate (glass substrate) 6 where the ITO film is formed on the microlens array 52, which is an embodiment of the light transmitting substrate to be disposed at the light incident side. The structure of the microlens array is of a lenticular type wherein a number of cylindrical lenses are arranged in parallel in a plane along an X-Z axis as shown in FIG. 26. As the structure of the microlens array, there are two types: a convex lens type microlens array which utilizes refraction at the interface between two kinds of material having different refractive indices, and a flat plate type microlens array wherein there is a distribution of refractive index in the direction of the depth of the glass substrate. In this embodiment, the flat plate type microlens array is used, which is prepared by using a photolithography technique and an ion exchanging process, which are well known techniques.

Further, a minute uneven portion 71 as shown in FIG. 34 is formed in the front surface of the substrate glass having the microlens array 52, and a transparent electrode (ITO) 7 is formed on the minute uneven portion 71. Thus, the counter substrate is prepared. The minute uneven portion can be formed on the display surface by using a sand blasting method. However, the surface to which the sealing material is applied should be a flat surface.

The minute uneven portion renders light to be subjected to Fresnel reflection at the ITO interface to become scattered light and is to prevent effectively the scattered light from passing through the opening portion of the projection lens to reach the screen. The pitch of the uneven portion should be sufficiently smaller than the size of display pixels but should have such a size to cause optical scattering. The depth of the uneven portion is several μm or less.

In this embodiment, the flat plate type microlens arrays 51 and 52 are formed on the same glass substrate. The microlens array 51 may be formed on the other glass substrate and bonded to the glass substrate wherein the microlens array 52 is formed in order to work as the first light converging means 1 and the second light converging means 2 in the same manner as shown in FIG. 34.

When the transparent-scattering type liquid crystal display element is used for reflecting light, light reciprocates in the LCSM layer to remarkably improve the scattering power in comparison with the case of using the one-time through type display element to transmit light. As a result, if the same light converging angle is used, the contrast ratio of the projected image is improved, and if the light converging angle is determined to have a large value so that the contrast ratio is the same, a further bright projected image is obtainable.

The mirror of dielectric multi-layered film may be formed by depositing dielectric films of high refractive index and dielectric films of low refractive index of $Ta_2O_5/SiO_2$ or $Si/SiO_2$ other than a combination of $TiO_2/SiO_2$. When a combination of dielectric films having a large difference of refractive indices is used, a high reflectance and a wide reflection wavelength band region can easily be obtained. Further, the resistance of the dielectric materials is preferably $10^{10} \Omega/cm^2$ or more.

The prepared active matrix substrate 5, the light transmitting substrate of front side 6 are used, and spacers are dispersed to keep the cell gap to be a constant value in a range of about 6–16 μm followed by coating a sealing material to thereby form a cell. Then, a liquid mixture of liquid crystal and monomer, oligomer, photo-initiator and so on is injected in the cell, and ultraviolet rays are irradiated to cure the monomer and so on to form resin, whereby the LCSM layer of composite form of a liquid crystal phase and a resin phase is formed. In particular, the LCSM layer using polymer is referred to as a liquid crystal/polymer composite (LC/PC). The LC/PC layer 4 is preferably used to form the transparent-scattering type liquid crystal display element.

A unit of the microlens array used in the first light converging means and the second light converging means in this embodiment corresponds to a set of RGB pixel elements which is a unit of colored image formed on the reflection type active matrix array substrate.

The display portion of the liquid crystal display element has a diagonal line of 24.00 cm(9.45 inches), and a pixel size of (100 μm×RGB)×300 μm wherein the display portion comprises (640×RGB) pixels in lateral direction×480 pixels in longitudinal direction, and the aperture rate of each pixel is 69% (75 μm×275 μm).

The pitch c of the flat plate type microlens array for the first light converging means and the second light converging means is 300 μm which is equal to the size of the set of RGB pixels, and the focal distance of the microlens array corresponds to 1.1 mm which is the thickness of the glass substrate 6. Parallel light fluxes of each color light of R, G and B from the light source for three colors RGB are made incident at a dispersing angle of øRGBx air)=6° in a plane along an X-Z axis into the reflection type liquid crystal display element.

In order to direct the optical axis of each of the color lights RGB to the center of each of the RGB picture electrodes in a plane along the X-Z axis as shown in FIG. 28, each of the color lights RGB should be inclined at an angle of $\alpha=5.2°$ in the substrate by using formula 6, namely, at an angle of $\alpha=78°$ to the interface between the substrate and air.

Since each of the color lights RGB has a dispersing angle of $\emptyset RGBx$ (glass)=$\sin^{-1}\{\sin(6°)/1.5\}=4°$ after the lights have been refracted in the glass plate, the light emitted from the flat plate type microlens array which corresponds to a pixel lens of 100 μm in a plane along the X-Z axis to the plane of a reflection pixel electrode is converged with a width wRGB=1.1×tan (4°)=77 μm from formula 7. Accordingly, the aperture ratio 67% is effectively improved to 89%. Accordingly, the efficiency of utilization of light is improved to 33% in comparison with the conventional panel in which the flat plate type microlens array is not formed. Further, a color display is possible by using the single plate liquid crystal display element and the three color lights R, G and B without providing a color-forming element in the display element itself.

In the same manner as Embodiment 5, the flat surface side of the flat convex spherical lens 13 having a focal distance of 180 mm is bonded with an optical adhesive to the light incident side light transmitting substrate 6 of the reflection type liquid crystal display element to form a reflection type liquid crystal display block. An anti-reflection film for visible light wavelength band region is formed on a convex surface of the lens.

In the next section, the light source system of three color lights RGB and the projection system effective for a high contrast display which are necessary for the display device of this embodiment will be described.

FIGS. 14 and 15 show an embodiment of the construction of a projection type color liquid crystal display device. The light source system of three colors RGB comprises a white color light source system which is used in Embodiment 5 or Embodiment 6 and a first filter of a spectral filter which allows to pass through light of each wavelength band region of R, G and B as shown in FIG. 31, the first filter being disposed in the vicinity of a first aperture 17. For the spectral filter, a dichroic filter having no light absorbing function and excellent in durability and color purity is preferably used. The transmittance characteristics of the dichroic filter is shown in FIG. 7.

In order to obtain the above-mentioned three color lights of RGB, the length hx in the direction of an X axis is hx=18.9 mm and the distance B1 in the direction of the X axis between the centers of adjacent spectral filters is B1=24.7 mm from formula 9. When the first aperture is adjusted so that only the length hy in the direction of a Y axis is changed, the dispersing angle $\emptyset RGBy$ and the mean value of dispersing angle $\emptyset RGBm$ in the direction of the Y axis can be changed.

Further, the projection optical system comprises a projection lens and a scattering light removing system. A second aperture 18 as a device for reducing scattering light has a structure that the size of its opening portion can be changed, and the second aperture 18 is disposed inside a projection lens system 19 which comprises a plurality of lenses. The second aperture 18 and a second filter 2 are disposed at a position where an image conjugated with the image of the light source of three colors RGB which is defined by the first aperture 17 and the first filter 1 disposed near the second focal position of an ellipsoidal mirror, wherein the conjugated image is formed by the condenser lens 13 and a part of a projection lens system 19. In this case, the spectral regions of RGB defined by the second aperture and the second color filter are made coincidence with the conjugated image of the light source of three colors RGB. A color image is formed on a projection screen (not shown) by the projection optical system including the second aperture 18 and the second filter 2.

With such structure, the contrast ratio of a projected image can remarkably be improved in comparison with that by using a projection optical system without using the second aperture 18 and the second filter 2 because scattering lights of RGB can effectively be removed.

When the projection type color liquid crystal display apparatus having such construction is used, the first aperture of changeable type in the light source optical system and the second aperture of changeable type in the projection optical system are respectively changed under the condition that dispersing angle $\emptyset m$=collection angle $\delta$ in the same manner as in Example 5 so that dispersing angle $\emptyset RGBm$=collection angle $\delta RGBm$ are changed, whereby the contrast ratio and the light flux on the projection screen can be adjusted.

Estimated values of the contrast ratio and the light flux on the projection screen are shown in Table 3.

TABLE 3

| $\phi$ RGBm | Projection light flux (lm) | Contrast ratio |
| --- | --- | --- |
| 4° | 300 | 200 |
| 6° | 600 | 120 |
| 8° | 1200 | 100 |
| 10° | 1700 | 80 |
| 12° | 1800 | 60 |

Accordingly, a display having suitable brightness and contrast ratio is obtainable depending on circumstances.

In this embodiment, data bus lines are arranged in parallel to the Y axis and gate bus lines are arranged in parallel to the Y axis respectively. Accordingly, liquid crystal on the gate bus lines to which an alternating voltage is not effectively applied remains in a scattering state whereby a dark display is provided. Therefore, there is no increase in the light quantity at an OFF state, and no substantial deterioration of the contrast ratio even when a light shielding film (black matrix: BM) which is usually used for the counter substrate is not formed, by using a flat plate type microlens arrays having no light converging function in the direction of the Y axis.

In this embodiment, the mirror of dielectric multi-layered film is formed on the light transmitting type transparent electrode to provide the reflection type pixel electrode structure. However, the pixel electrode itself may be a reflection electrode of aluminum instead of using the ITO transparent electrode.

A minute uneven surface is formed in the counter electrode to prevent reflection of light. However, an anti-reflection film of multi-layered structure comprising ITO films as a structural element may be formed on a flat surface of the glass plate to reduce reflection of light at the interface.

This embodiment is described on the assumption that the length hy of opening in the direction of the Y axis of spectral filters for R, G and B which constitute the first and second filters are respectively the same. However, spectral filters having different hy for R, G and B may be used. Generally, there is a tendency that the scattering power of LC/PC layer has a wavelength dependency wherein when a spectrum region shifts to a longer wavelength region, the scattering power decreases. As a result, there occurs a phenomenon that the contrast ratio of a projected image varies depending on wavelength regions, or the voltage-transmittance characteristics in a half tone varies.

In order to reduce such wavelength dependence with the projection optical system, the length hy of the opening in the Y axis direction of the spectral filters for R, G and B should be different for wavelength regions, and the directivity of incident light to the liquid crystal display element and the directivity of emission light passing through the scattering light removing system be different for wavelength regions. Specifically, when the scattering power decreases in the order of B>G>R, hy of the spectral filters for R, G and B should be adjusted to be hy(B)>hy(G)>hy(R).

The projection type display apparatus of the present invention provides an improved color gamut and a high contrast ratio for a projected image even when a single transparent-scattering type liquid crystal display element wherein color filters for R, G and B each formed by mixing a coloring material in resin are formed for each pixel, is used.

Further, a further high efficiency of utilization of light can be obtained in a case of using the same contrast ratio, and a higher contrast ratio can be obtained in a case of using the same efficiency of utilization of light, in comparison with a projection type display apparatus using a conventional transparent-scattering type display element.

Further, in the projection type display apparatus of the present invention, the wavelength dependence on the contrast ratio of a projected image can be reduced and high color reproducibility can be achieved even when a single or a plurality of transparent-scattering type liquid crystal display elements having the same structure are used.

Further, a higher efficiency of utilization of light can be obtained in a case of using the same contrast ratio and a higher contrast ratio can be obtained by using the same efficiency of utilization of light, in comparison with a projection type display apparatus using a conventional transparent-scattering type display element. Further, the emission spectrum of the light source can be corrected to improve the color purity by suitably determining the RGB spectral characteristics of color separating filters.

In the invention described in Embodiment 1, a small-sized projection type color display apparatus having a high color purity of R, G and B colors can be obtained at a low cost since a single transparent type panel is used.

In the invention described in Embodiment 2, a small-sized projection type display apparatus free from color shift in a half tone can be obtained since a single panel is in particular used.

In the invention described in Embodiment 3, a projection type display apparatus providing a bright display can be obtained without reducing the number of pixels since three panels are in particular used.

In the invention described in Embodiment 4, a projection type display apparatus providing a full-colored display having a high contrast ratio with the same brightness or a bright display with the same contrast ratio can be obtained in comparison with a transmissive type panel, since a single reflection type panel is in particular used.

In the invention described in Embodiment 5, a projection type display apparatus providing a bright, full-colored display can be obtained without reducing the number of pixels since three reflection type panels are in particular used.

In the invention described in Embodiment 6, an illuminating apparatus providing a high speed color light regulating can be obtained with a small change of color temperature, since three reflection type shutters are in particular used.

In the invention described in Embodiment 7, a projection type display apparatus providing a bright display can be obtained without using conventional color filter in a display element, since a single reflection type panel having a pair of the light converging means 1 and 2 per each pixel is fabricated.

And the present invention is applicable to a TN-type LCD projector whose liquid crystal display element has a transparent-absorbing operation mode.

Further, the present invention is also applicable to a spatial light modulator (SLM) and so on in which a laser shutter using a liquid crystal optical element or a photoconductive material is used as an image lighting medium for a reflection type LCSM-LCD.

The present invention can be used for various applications as far as the effect is not reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A projection type display apparatus comprising a light source, a display element, a mirror, and a projection means, characterized in that:

an image forming element is disposed in a light path at a light incident side of the display element and/or a light path at a light emission side of the display element;

a first filter having a spectroscopic function is disposed in the light path at the light incident side of the display element;

a second filter having a spectroscopic function is disposed in the light path at the light emission side of the display element;

the first and second filters are arranged in a conjugated positional relation with respect to the image forming element disposed in a light path between the first and second filters;

the light source is located in the vicinity of a first focal point of the mirror and the first filter is located in the vicinity of a second focal point of the mirror;

a plurality of regions $S_x$ (X=1 to n, n≧2) are formed in the light passing plane of the first filter so that at least one of the regions allows only light having a specified wavelength range to pass through;

the image forming element is a condenser lens by which diffusion light which has passed through the first filter is converged to the display element, and a conjugated image of the first filter is formed at or around the position of a pupil of the projection means; and a plurality of regions $S_Y$ (Y=1 to n, n≧2) are formed in a light passing plane of the second filter so that at least one of the regions allows only light having a specified wavelength range which has passed through the display element, to pass through.

2. A projection type display apparatus according to claim 1, wherein each of the first and second filters is provided with regions for regulating the wavelength range of three transmitting lights: red (R), green (G) and blue (B).

3. A projection type display apparatus according to claim 2, wherein the display element has color filters of R, G and B for each pixel so that electric signals for picture image which correspond to the respective colors are applied to each pixel.

4. A projection type display apparatus according to claim 1, wherein the display element is transparent-scattering type liquid crystal display element, and the light source, the display element and the projection means are so arranged to form a Schlieren optical system.

5. A projection type display apparatus according to claim 4, wherein an auxiliary optical means is combined with the light source so that light fluxes having a dispersing angle of 10° or less with respect to the light of a specified wavelength which is regulated by the first filter, is irradiated to the display element.

6. A projection type display apparatus according to claim 4, wherein the display element is a transparent-scattering type liquid crystal display element comprising substrates which electrodes and a liquid crystal/resin composite layer including a nematic liquid crystal phase of positive dielectric anisotropy and a resin phase, which is interposed between the substrates.

7. A projection type display apparatus according to claim 1, wherein the display element is a transparent-scattering type liquid crystal display element, and the surface area of the opening of the first filter region which passes a wavelength range of light providing a low scattering power is smaller than the surface area of the opening of the first filter region which passes a wavelength range of light providing a high scattering power.

8. A projection type display apparatus according to claim 7, wherein the light passing plane of each of the first and second filters is provided with a region $S_A$ which passes a wavelength range A having the central wavelength $\lambda_A$, and a region $S_B$ which passes a wavelength range B having the central wavelength $\lambda_B$, and a relation of $0.8 \leq (K_A/K_B)^{0.5} \times (\lambda_A/\lambda_B) \leq 1.2$ is satisfied where $K_A$ or $K_B$ represents a surface area occupied by the regions $S_A$ or $S_B$ in the light passing plane.

9. A projection type display apparatus according to claim 1, wherein the display element is a reflecting type display element having a reflecting layer by which incident light is specularly reflected and then projected.

10. A projection type display apparatus according to claim 9, wherein the reflecting layer is made of a dielectric multi-layered material.

11. A projection type display apparatus according to claim 1, wherein the mirror is a spheroidal mirror.

12. A projection type display apparatus according to claim 1, wherein the mirror is an ellipsoidal mirror.

13. A projection type display apparatus which comprises:
a light source;
an image forming element;
a reflection type display element comprising a light incident side transparent substrate, a light reflecting substrate having a reflecting layer, an electro-optical function layer interposed between the substrates, a pixel electrode, a first light converging means disposed at a position without contact to the electro-optical function layer of the light incident side transparent substrate so as to face the pixel electrode, and a second light converging means disposed between the electro-optical function layer and the light incident side transparent substrate;
a projection means;
an image forming element disposed in a light path at the light incident side of the display element;
a first filter having spectroscopic function disposed in the light path at the light incident side of the display element;
a second filter having a spectroscopic function disposed in the light path of the light reflected off of the display element, wherein the first and second filters are arranged in a conjugated positional relation with respect to the image forming element disposed in a light path between the first and second filters.

14. A projection type display apparatus according to claim 13, wherein the focal distance $f_1$ of the first light converging means is substantially equal to the focal distance $f_2$ of the second light converging means, and the distance t between the principal points of the first and second light converging means is substantially equal to the focal distance $f_1$ or the focal distance $f_2$.

15. A projection type display apparatus according to claim 14; wherein
the first and second light converging means respectively have a lenticular structure comprising a plurality of cylindrical optical converging elements;
the light source and the display element are so arranged that an optical axis AX of incident light to the display element and an optical axis BX of light reflected by the reflecting layer of the display element and then emitted cooperatively form an angle of $2\gamma=2°-40°$ where a Y axis represents the azimuth of the parallel arrangement of the lenticular structure without having a light converging function and an X axis represents an othogonal axis to the azimuth of the parallel arrangement of the lenticular structure having a light converging function; and
the first and second light converging means are so arranged that a plane defined by the optical axis AX and the optical axis BX is in parallel to the Y axis.

16. A projection type display apparatus according to claim 15, wherein the first light converging means and/or the second light converging means is a microlens array.

17. A projection type display apparatus according to claim 13, which further comprises an ellipsoidal mirror, wherein
the light source is located in the vicinity of the first focal point of the ellipsoidal mirror and the first filter is located in the vicinity of the second focal point of the ellipsoidal mirror;
a plurality of regions $s_x$ (X=1 to n, n≧2) are formed in the light passing plane of the first filter so that at least one of the regions allows only light having a specified wavelength range to pass through;
the image forming element is a condenser lens by which diffusion light which has passed through the first filter is converged to the display element, and a conjugated image provided by the first filter is formed at or around the position of the pupil of the projection means;
a plurality of regions $s_y$ (Y=1 to n, n≧2) are formed in the light passing plane of the second filter so that at least one of the regions allows only light having a specified wavelength range in the light which has passed through the display element, to pass through.

18. A projection type display apparatus according to claim 13, wherein the display element is transparent-scattering type liquid crystal display element, and
the light source, the display element and the projection means are so arranged to form a Schlieren optical system.

19. A projection type display apparatus according to claim 13, wherein the display element is a transparent-scattering type liquid crystal display element, and the surface area of the opening of the first filter region which passes a wavelength range of light providing a low scattering power is smaller than the surface area of the opening of the first filter region which passes a wavelength range of light providing a high scattering power.

20. A projection type display apparatus according to claim 17, wherein the first and second filters respectively have a spectroscopic function for three colors of R, G and B;

the optical axes AR, AG and AB of the color lights of R, G and B are in the same plane so that the optical axes AR, AG and AB adjacent to each other form an angle in a range of $\alpha=1°-12°$, and electric signals for color image which correspond to R, G and B are applied to each pixel in the display element.

21. A projection type display apparatus according to claim 20, wherein a pair of the first and second light converging means are arranged to correspond to three pixel elements R, G and B which correspond to a pixel for a synthesized image with colors R, G, and B;

the light source is an actual light source where at least three colors R, G and B are created;

an image of a virtual light source from the actual light source emitting three colors of R, G and B is formed to correspond to each color of the R, G and B pixel elements in the display element by means of the pair of first and second light converging means;

the image of the virtual light source of the actual light source of three colors R, G and B is formed in the light path behind the display element after the image has been reflected by a reflecting layer of the display element; and the second filter for controlling each color R, G and B is disposed so as to correspond to the image of the virtual light source.

* * * * *